(12) United States Patent  
Monroe

(10) Patent No.: US 6,636,748 B2  
(45) Date of Patent: *Oct. 21, 2003

(54) METHOD AND APPARATUS FOR IMAGE CAPTURE, COMPRESSION AND TRANSMISSION OF A VISUAL IMAGE OVER TELEPHONE OR RADIO TRANSMISSION SYSTEM

(76) Inventor: David A. Monroe, P.O. Box 780907, San Antonio, TX (US) 78278-0907

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/005,932

(22) Filed: Jan. 12, 1998

(65) Prior Publication Data

US 2002/0051527 A1 May 2, 2002

(51) Int. Cl.⁷ .................................................. H04Q 7/20
(52) U.S. Cl. ........................... 455/556; 348/14; 455/557
(58) Field of Search ............................ 348/14, 17, 158, 348/233, 376; 379/413, 556; 455/557

(56) References Cited

U.S. PATENT DOCUMENTS

| | | | | |
|---|---|---|---|---|
| 4,962,526 A | * | 10/1990 | Kotani et al. ................ | 379/100 |
| 5,038,202 A | * | 8/1991 | Ooishi et al. ................ | 348/396 |
| 5,184,163 A | * | 2/1993 | Wagerer ....................... | 348/17 |
| 5,528,285 A | * | 6/1996 | Morikawa et al. ............ | 348/14 |
| 5,530,478 A | * | 6/1996 | Sasaki et al. ................. | 348/405 |
| 5,550,754 A | * | 8/1996 | McNelley et al. ............ | 348/14 |
| 5,568,185 A | * | 10/1996 | Yoshikazu .................... | 348/22 |
| 5,579,239 A | * | 11/1996 | Freeman et al. .............. | 348/14 |
| 5,673,079 A | * | 9/1997 | Satoh .......................... | 348/15 |
| 5,711,013 A | * | 1/1998 | Collett et al. ................ | 455/558 |
| 5,727,049 A | * | 3/1998 | Sato ........................ | 379/93.17 |
| 5,754,227 A | * | 5/1998 | Fukuoka ...................... | 348/232 |
| 5,771,102 A | * | 6/1998 | Vogt et al. ................... | 358/433 |
| 5,793,416 A | * | 8/1998 | Rostoker et al. ............. | 348/17 |
| 5,841,971 A | * | 11/1998 | Longginou et al. ......... | 709/200 |
| 5,850,251 A | * | 12/1998 | Tsuchida ..................... | 348/17 |
| 5,854,694 A | * | 12/1998 | Payne et al. ................. | 358/473 |
| 5,893,037 A | * | 4/1999 | Reele et al. ................. | 455/556 |
| 5,969,750 A | * | 10/1999 | Hsieh et al. .................. | 348/15 |
| 6,038,295 A | * | 3/2000 | Mattes ..................... | 379/93.25 |
| 6,085,112 A | * | 7/2000 | Kleinschmidt et al. ...... | 455/556 |
| 6,122,526 A | * | 9/2000 | Parulski et al. ............. | 455/556 |
| 6,181,954 B1 | * | 1/2001 | Monroe et al. ............. | 455/557 |
| 6,452,626 B1 | * | 9/2002 | Adair et al. ................. | 348/158 |

* cited by examiner

Primary Examiner—Daniel Abebe  
(74) Attorney, Agent, or Firm—Jackson Walker L.L.P.

(57) ABSTRACT

An image capture, conversion, compression, storage and transmission system provides a data signal representing the image in a format and protocol capable of being transmitted over any of a plurality of readily available transmission systems and received by readily available, standard equipment receiving stations. The system is adapted to be installed in a standard cellular phone configuration, providing a portable, hand held, wireless transmission system for transmitting video image signals to a remote receiving station.

19 Claims, 51 Drawing Sheets

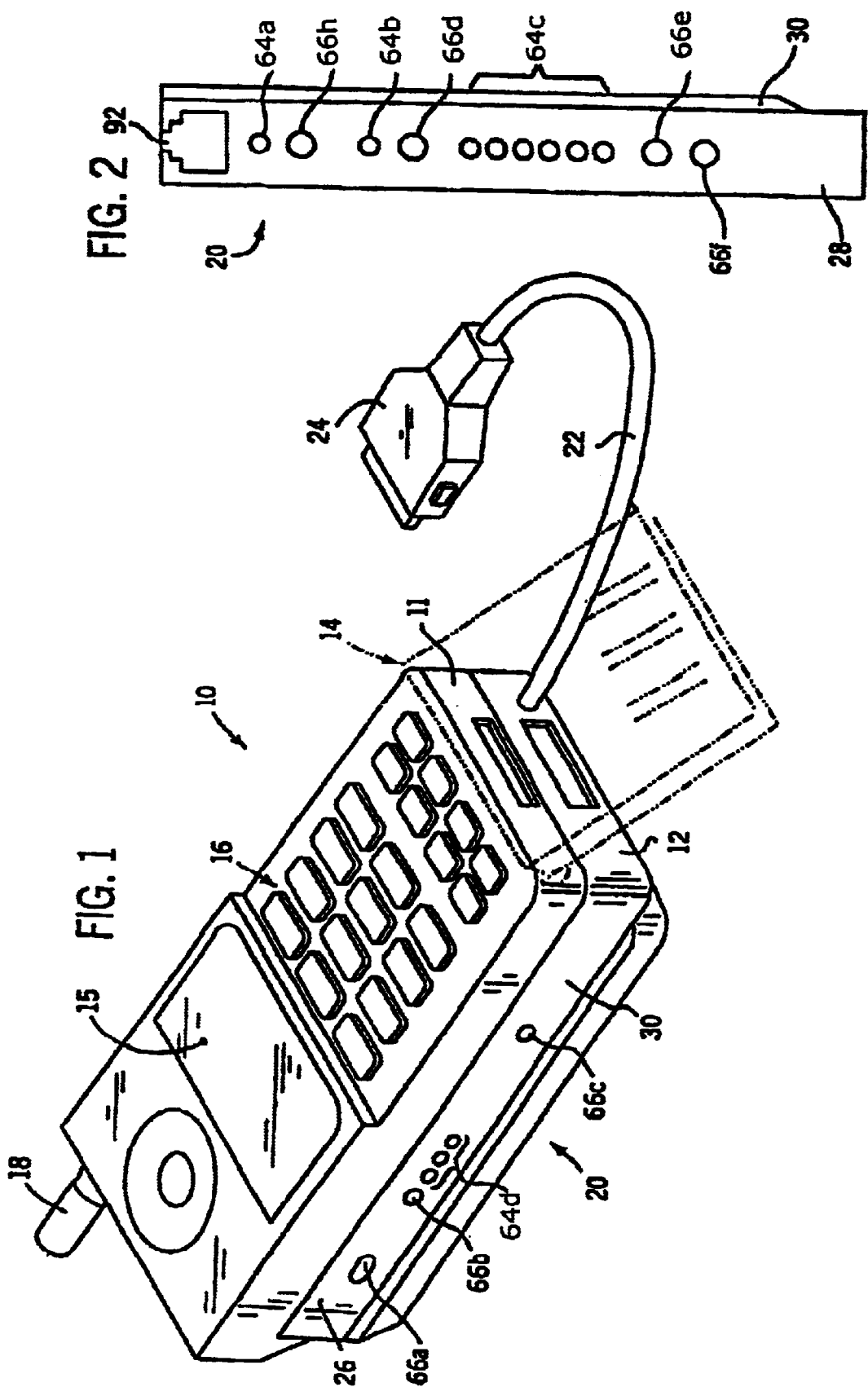

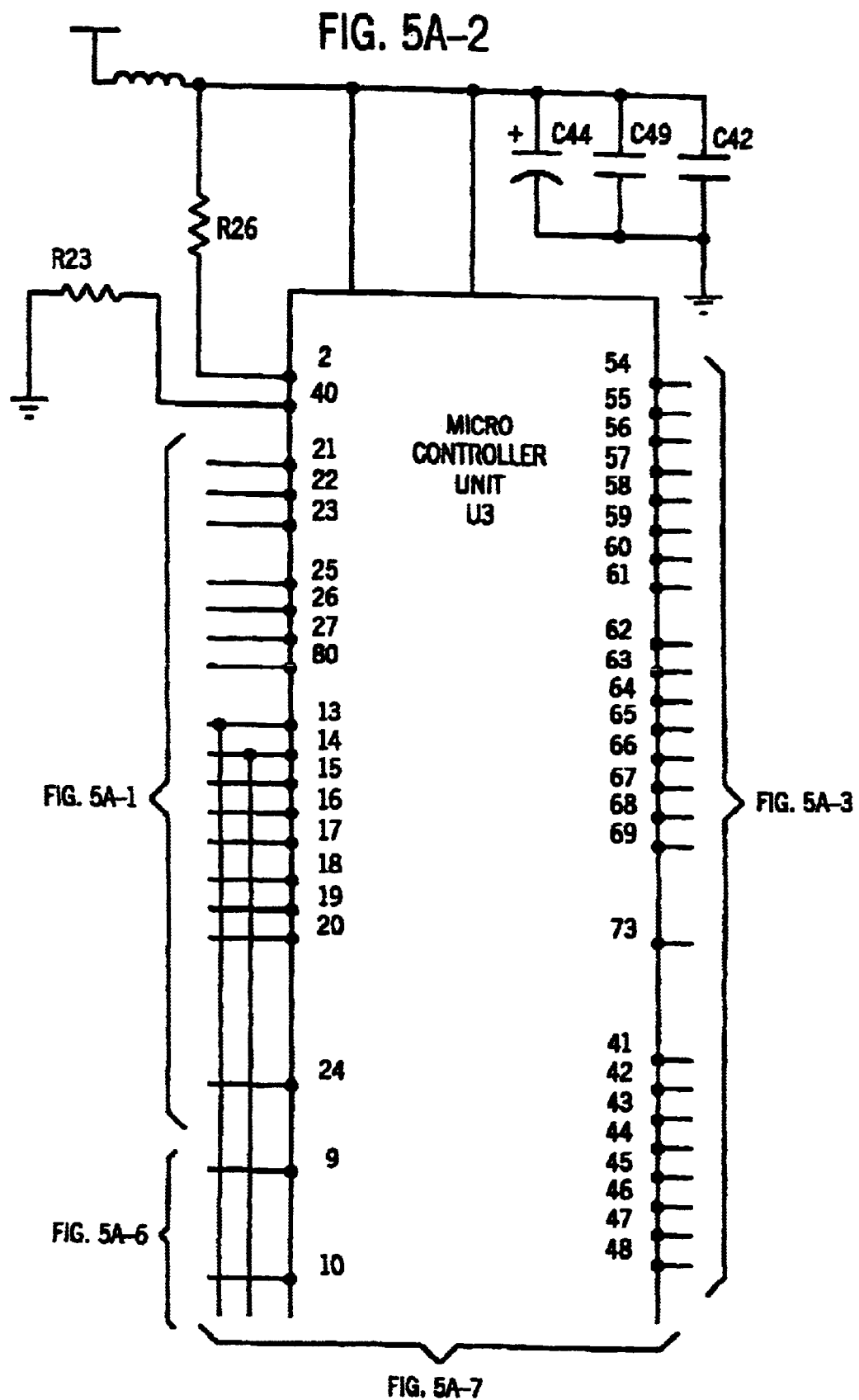

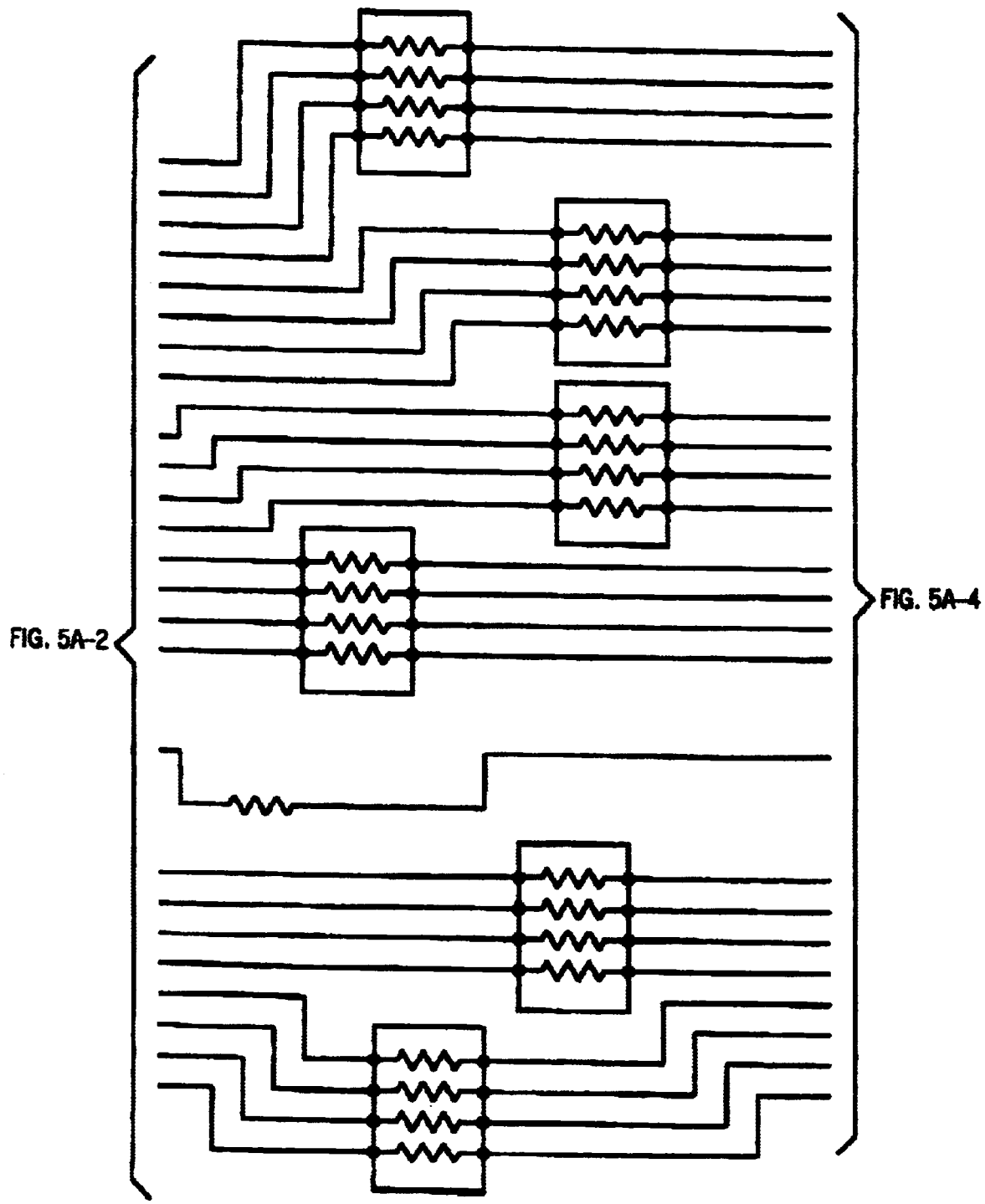

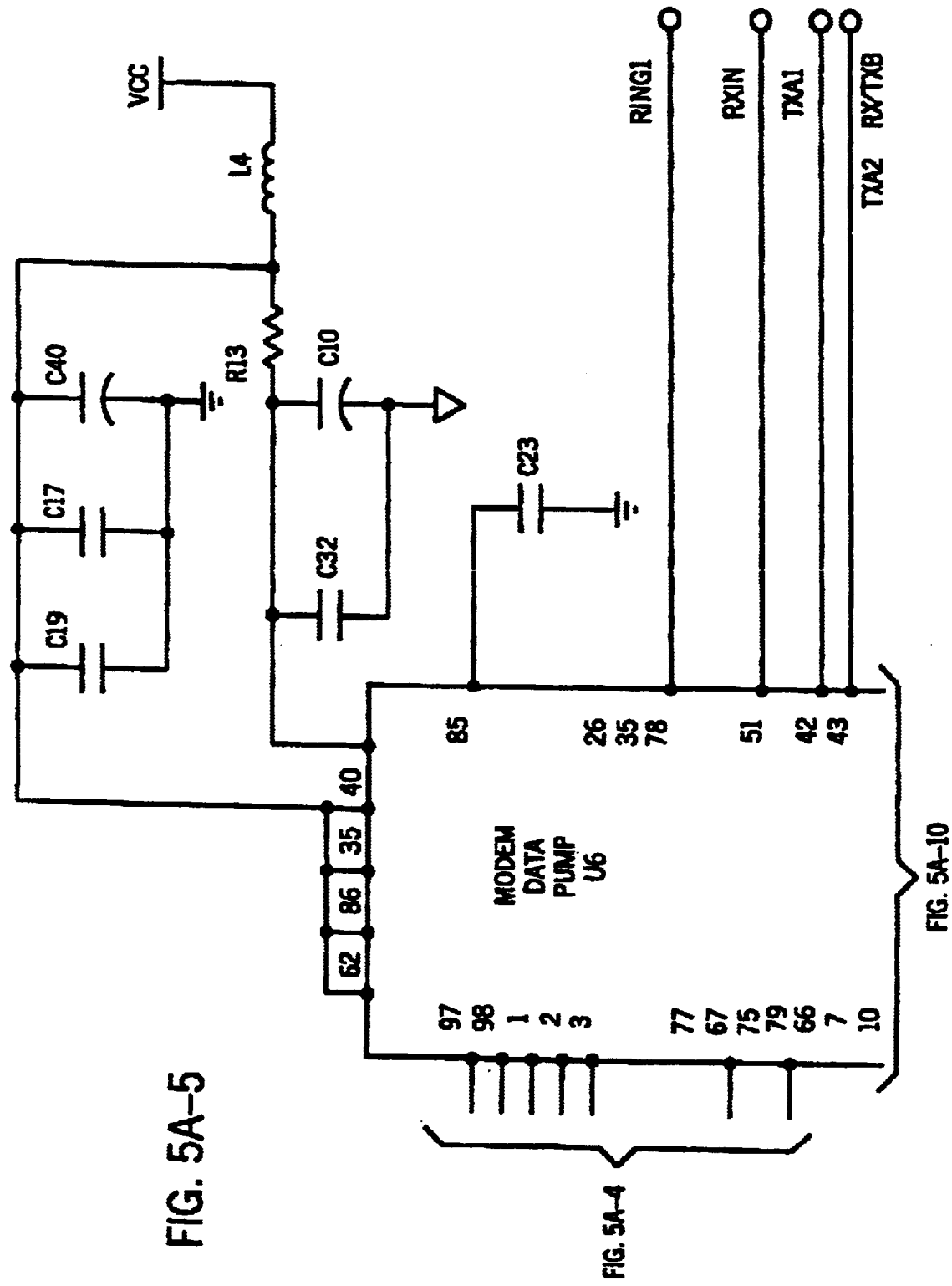

FIG. 5A-9
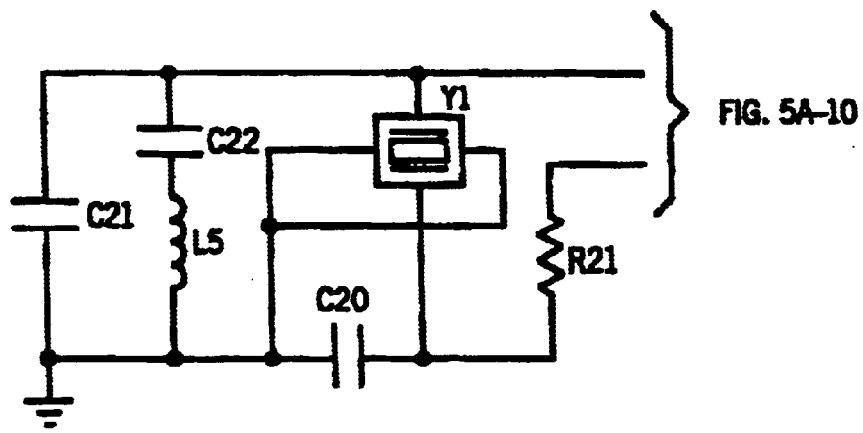
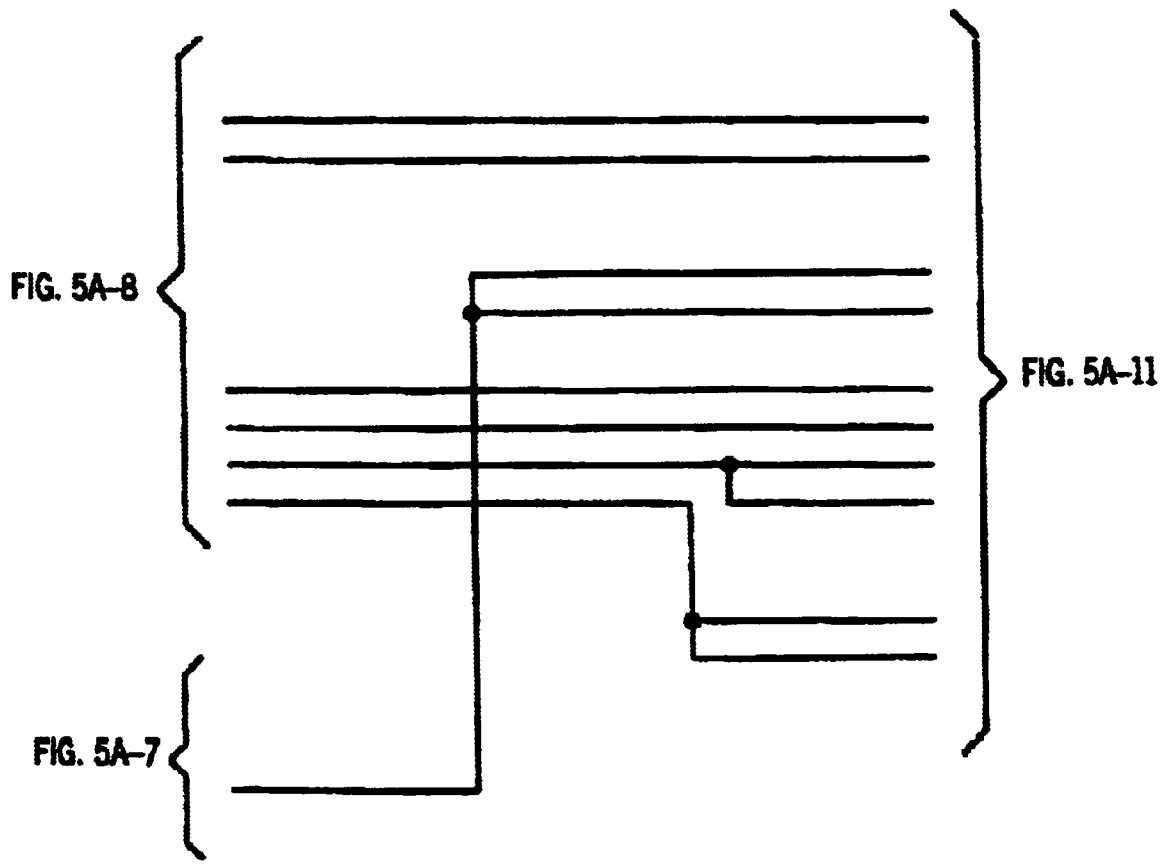

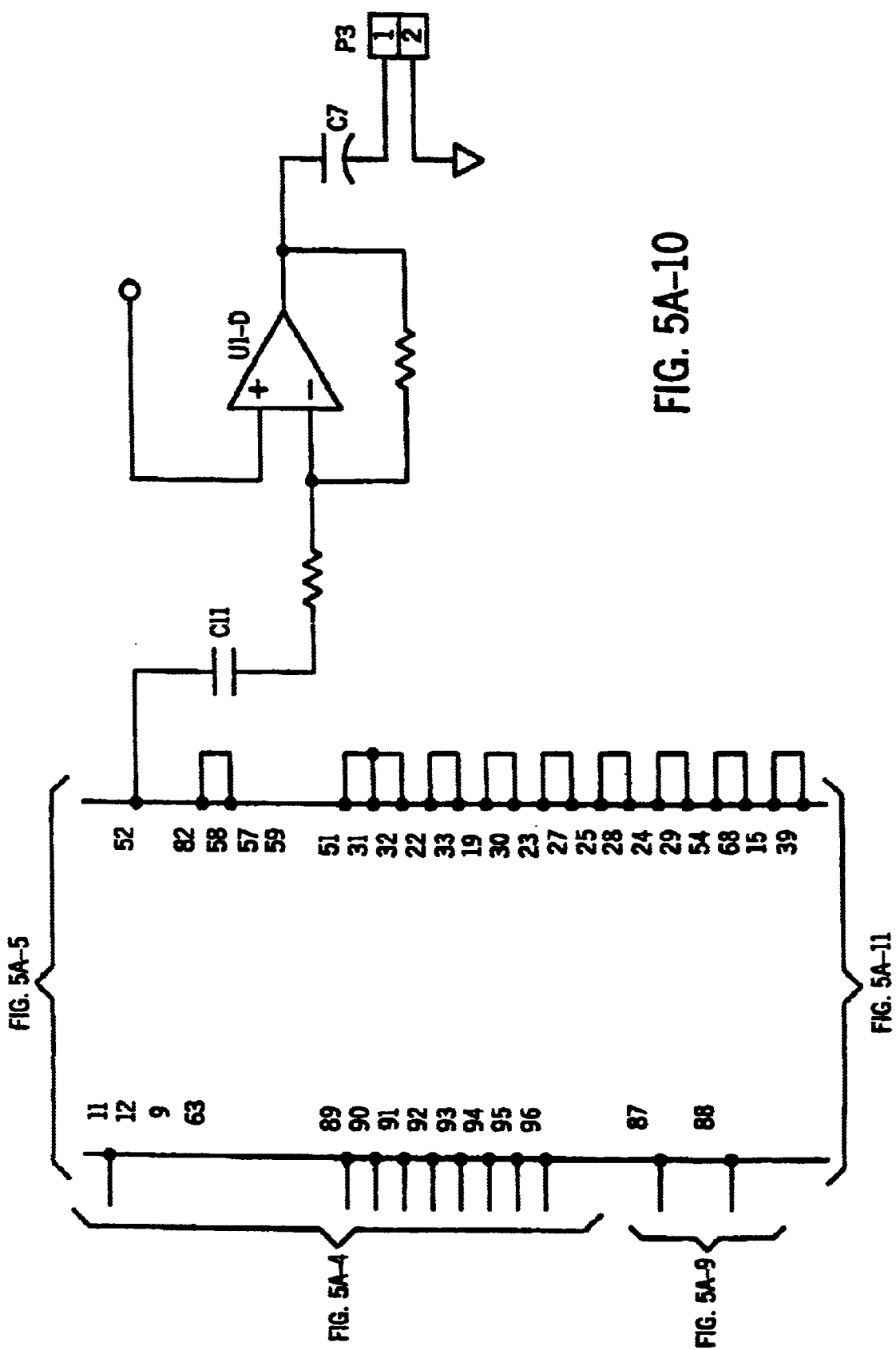

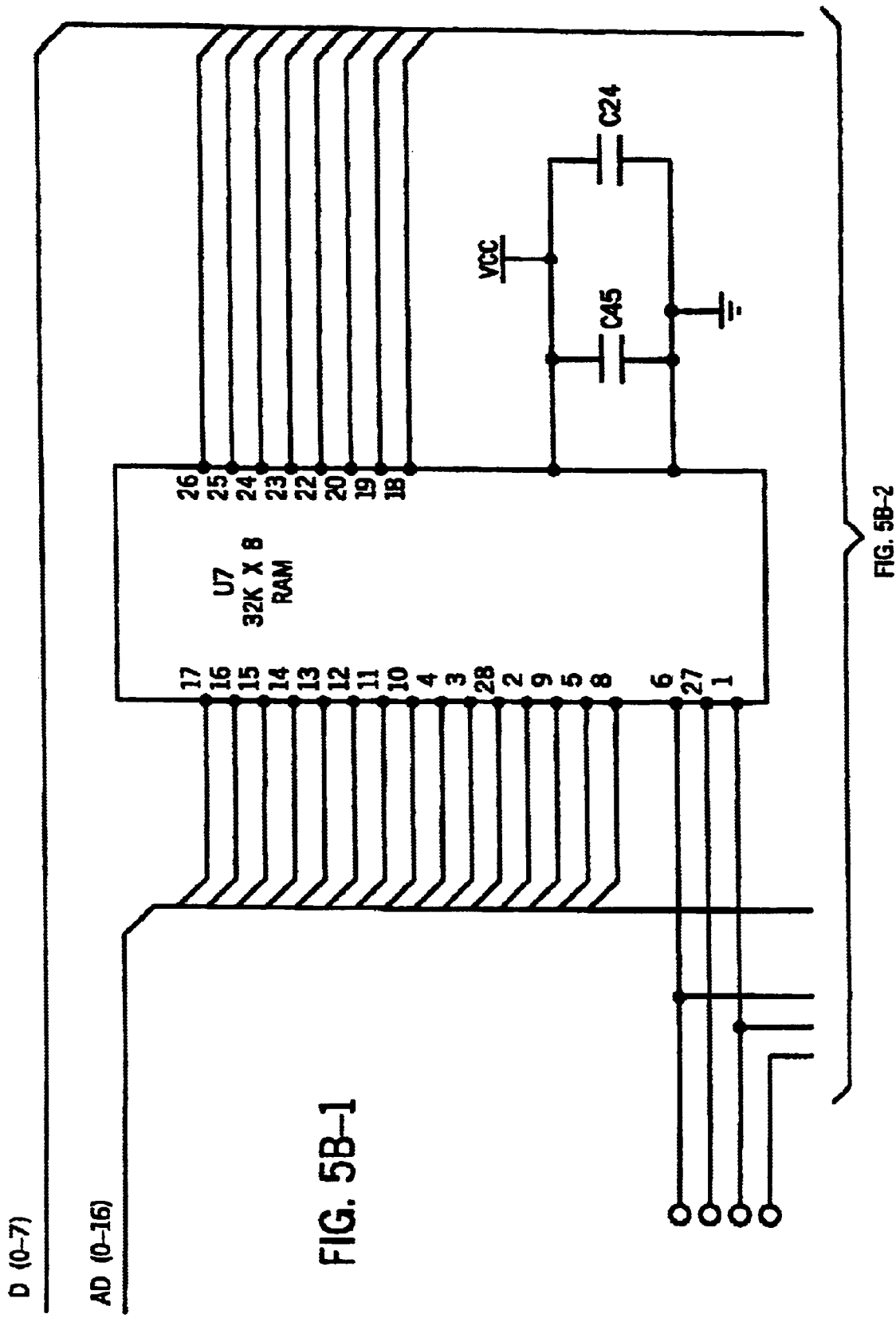

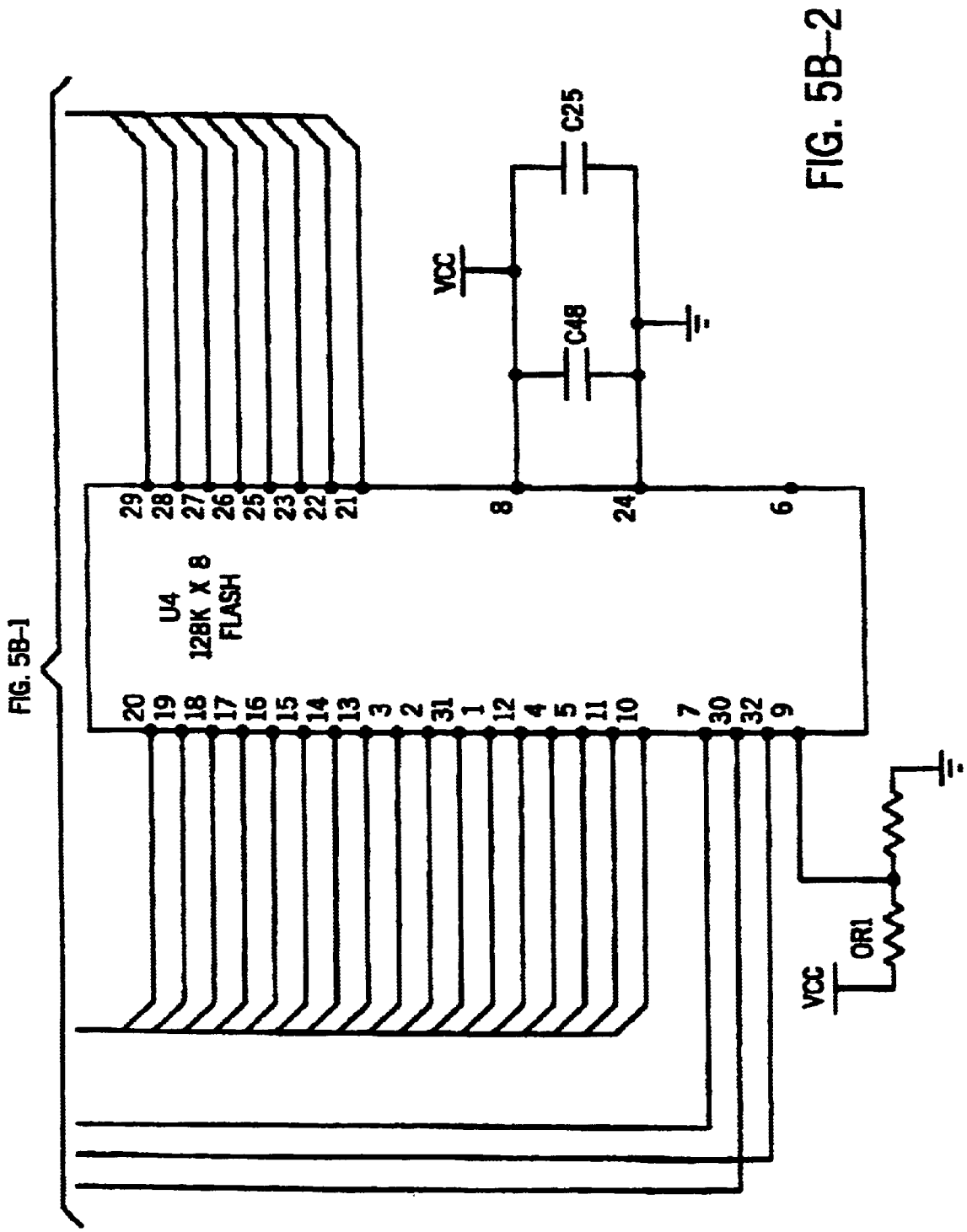

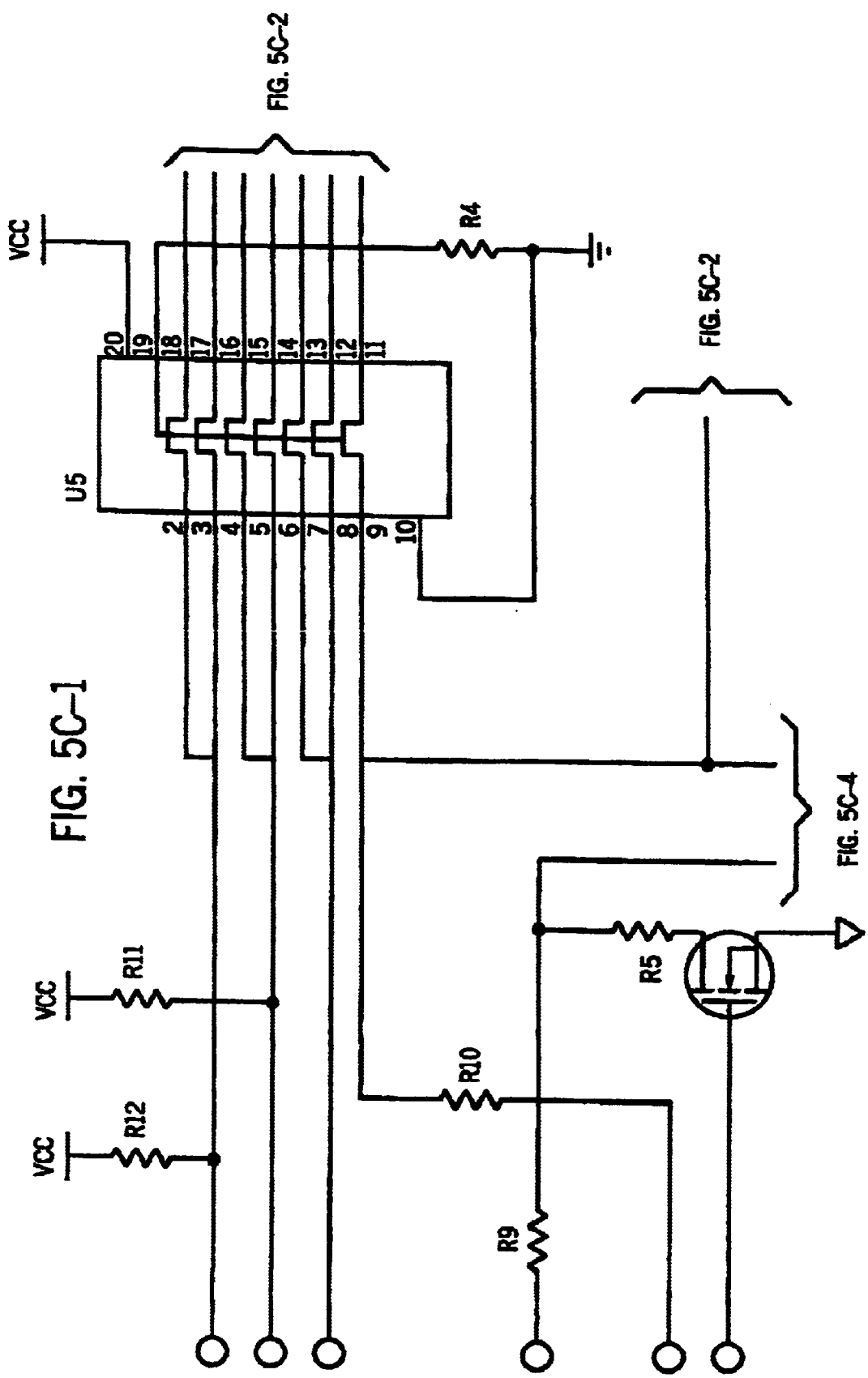

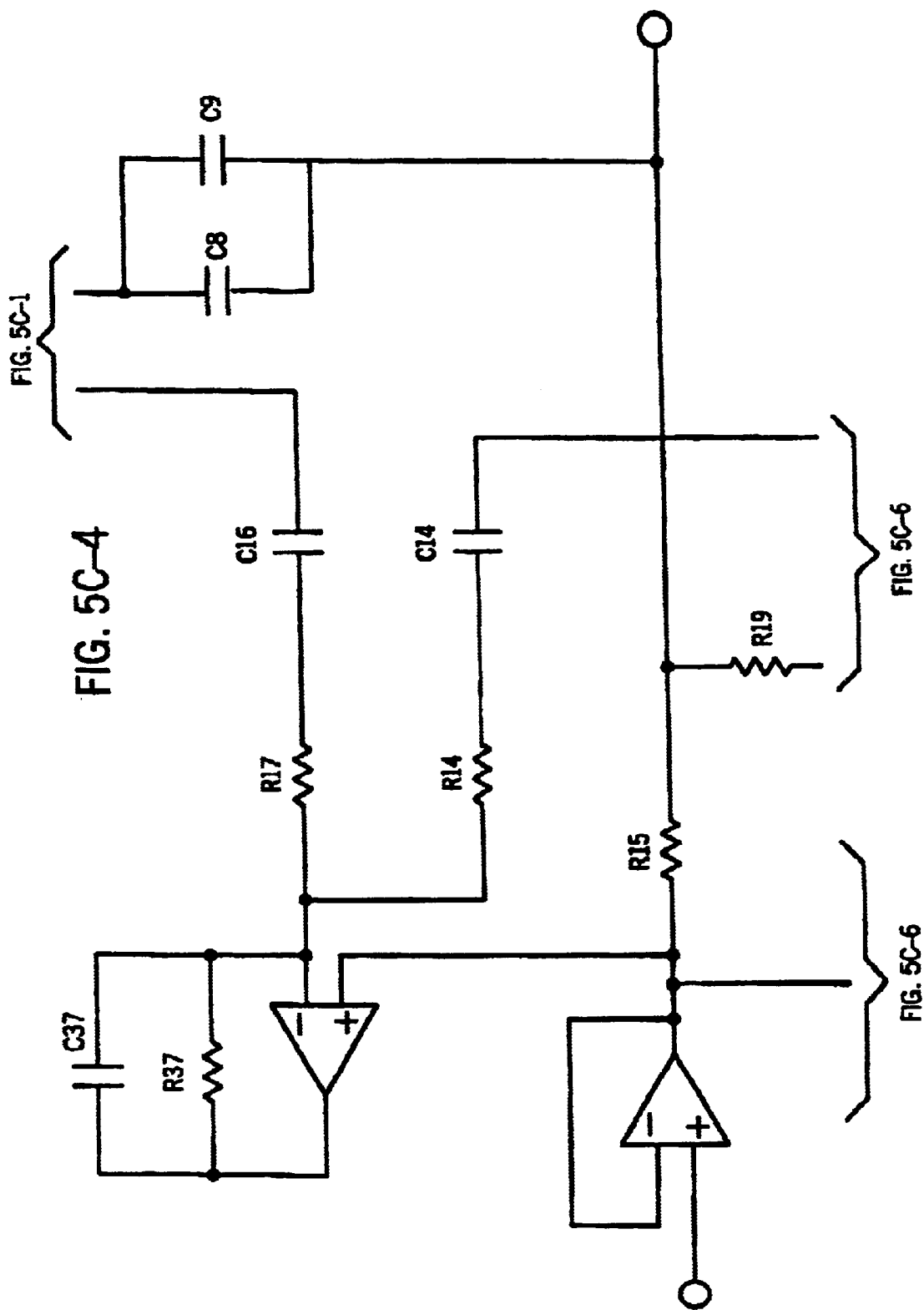

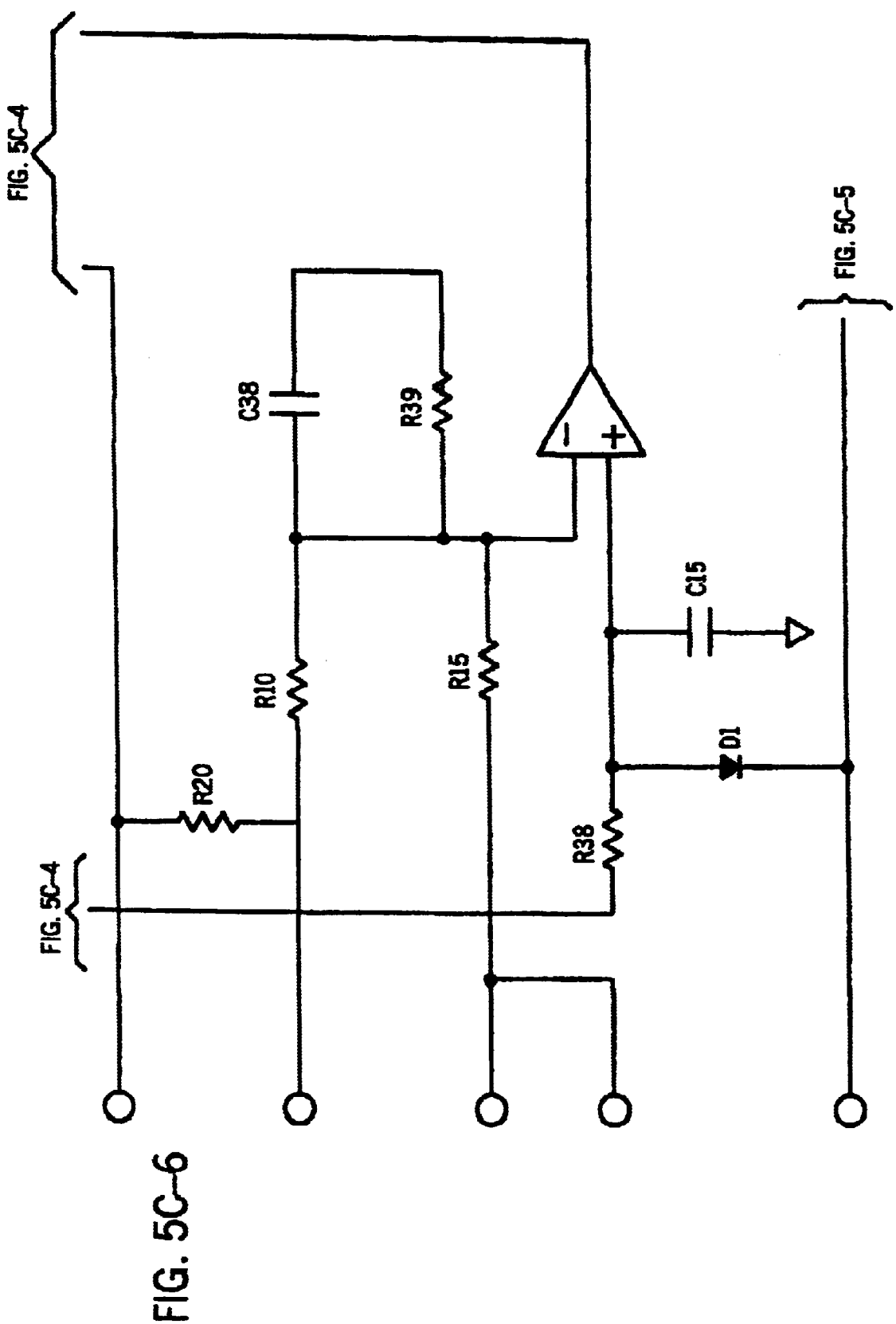

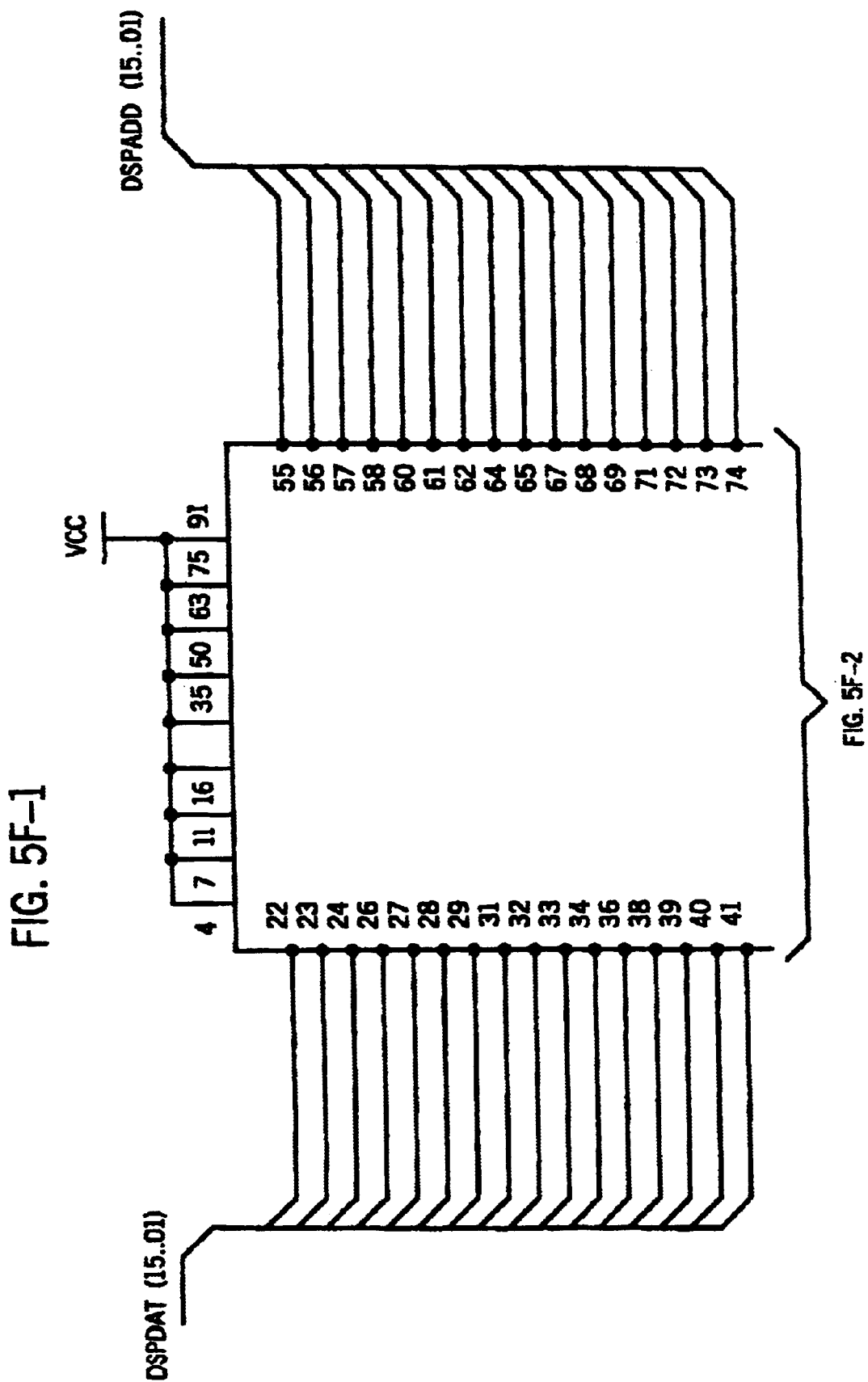

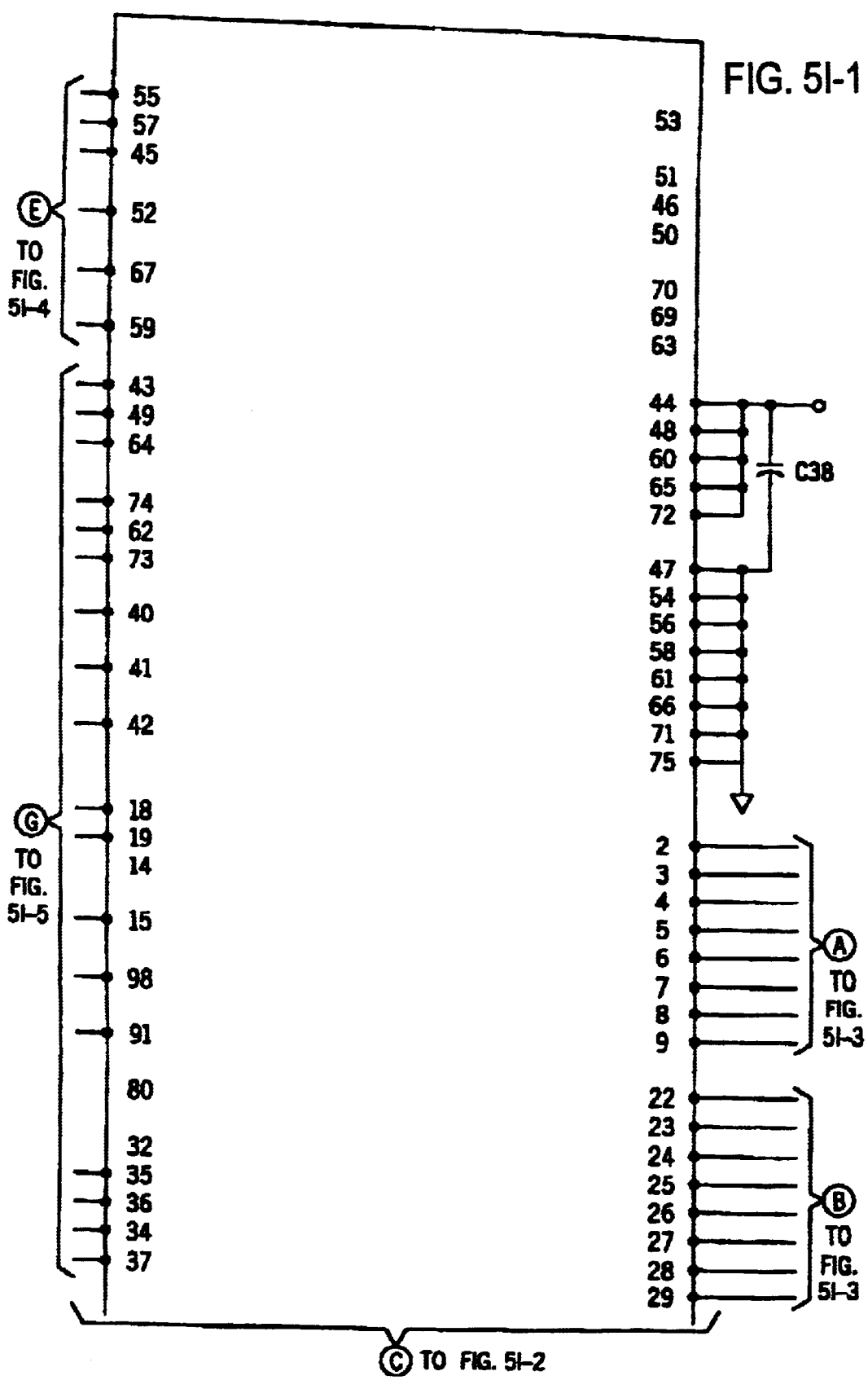

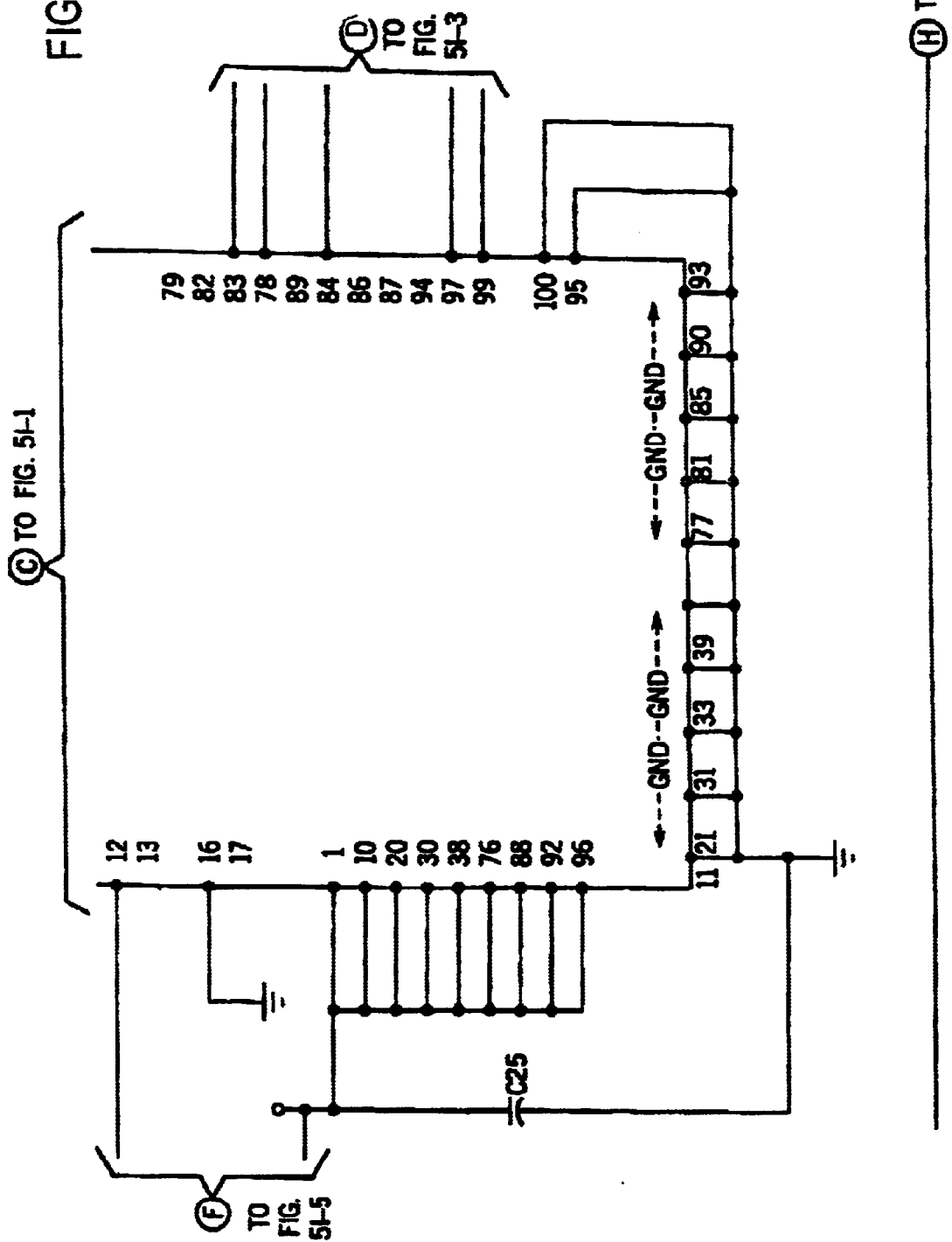

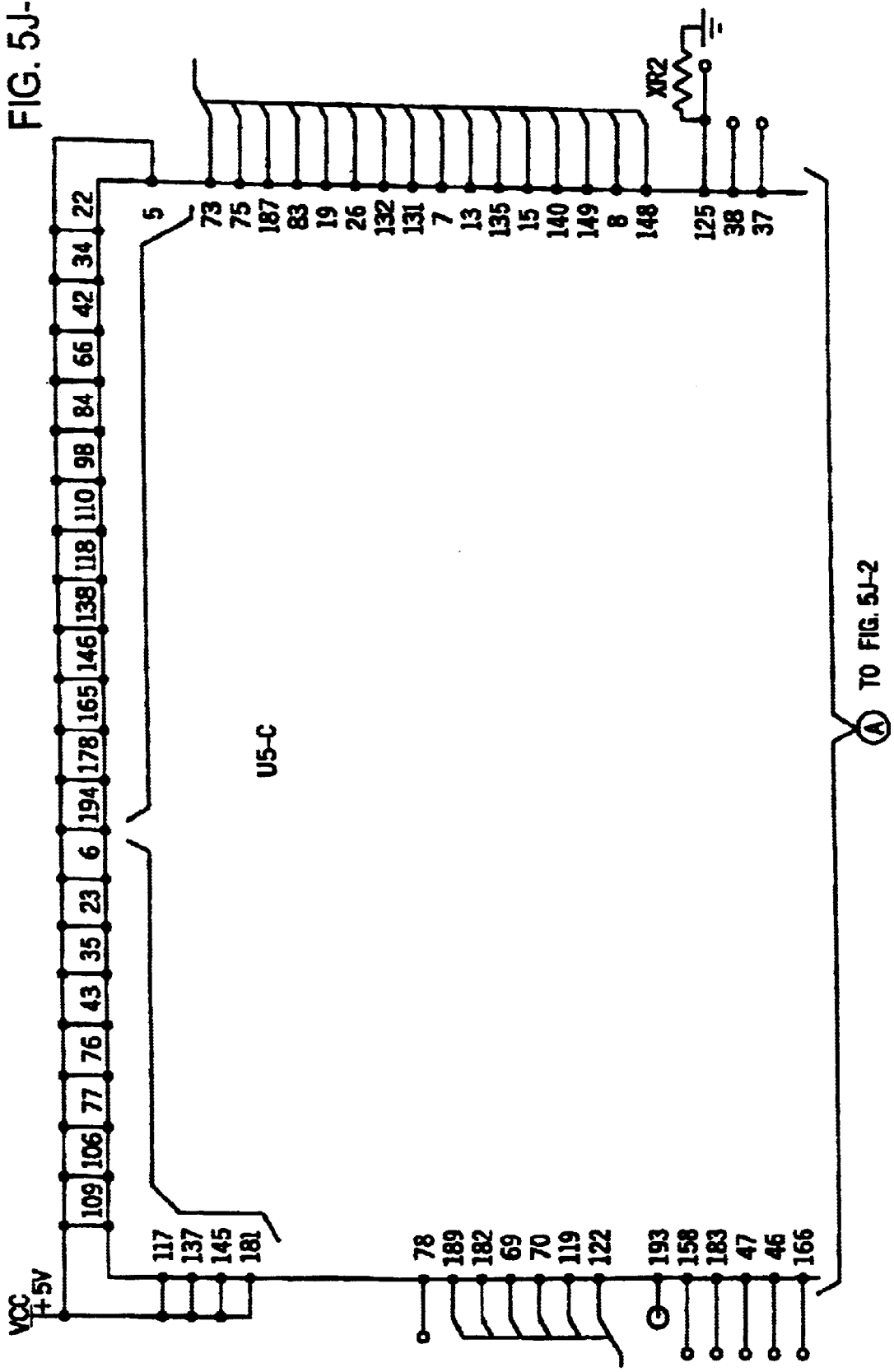

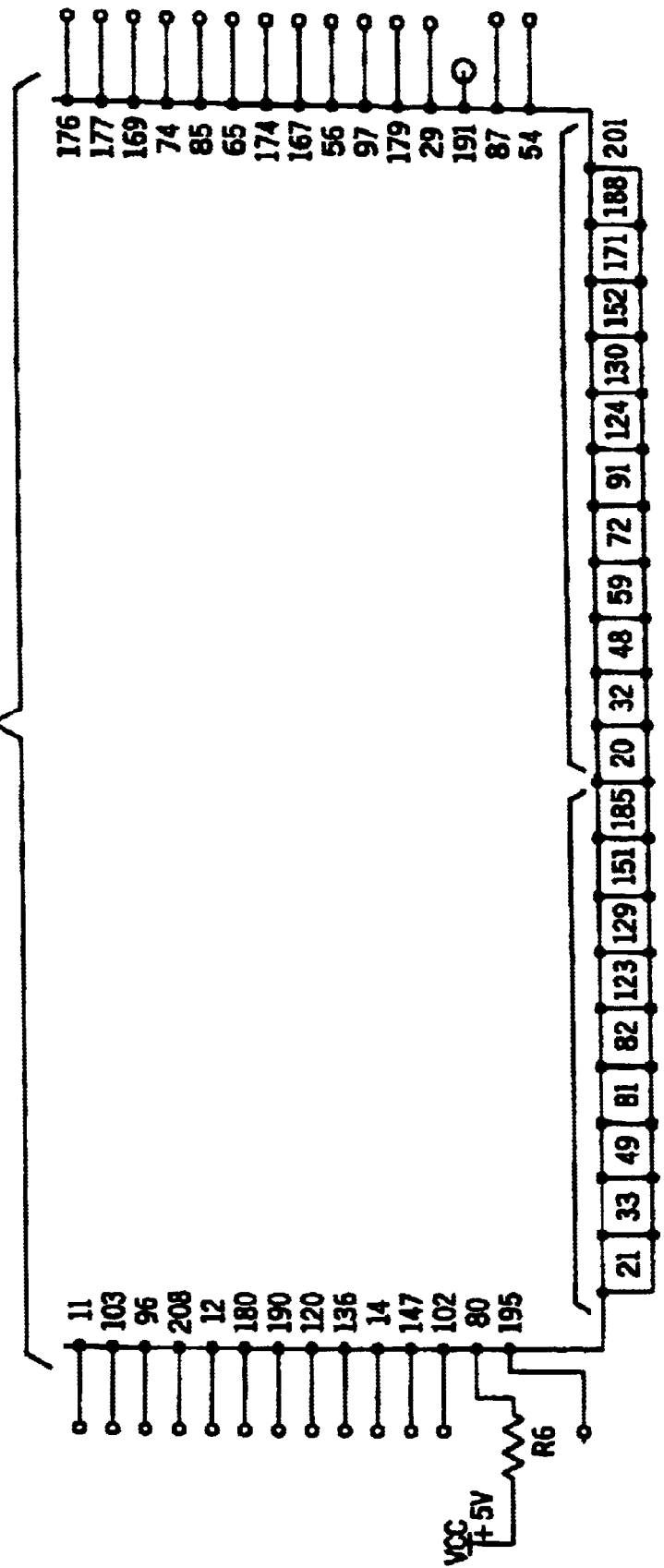

METHOD AND APPARATUS FOR IMAGE CAPTURE, COMPRESSION AND TRANSMISSION OF A VISUAL IMAGE OVER TELEPHONE OR RADIO TRANSMISSION SYSTEM

BACKGROUND OF THE INVENTION

1. Field of the Invention

The invention is generally related to image capture and transmission systems and is specifically directed to an image capture, compression and transmission system specifically designed for field applications with wired, wireless and/or synchronous serial devices.

2. Discussion of the Prior Art

Industry has developed and continues to develop and enhance techniques for scanning, compressing, transmitting, receiving, decompressing and printing documents. This technology, encompassing the full body of facsimile transmission and reception, is currently in widespread use. The current standards, CCITT Group III and Group IV, define methods to scan and transmit high quality, bi-level images with a high degree of success and has become commercially acceptable throughout the world. However, gray scale documents and images are not easily transmitted because the scanners and algorithms are not tailored to the function. Three dimensional objects will not fit into the flat document scanners and cannot be transmitted.

Examples of systems that have addressed some of these issues are shown in U.S. Pat. No. 5,193,012 which shows a video to facsimile signal converter, and U.S. Pat. No. 3,251,937 which discloses a system for transmitting still television pictures over a telephone line.

Wire photography, and its extension, radio photography, have long been used by the news media. The most common form involves an input device that converts photographs into encoded signals for communication over telecommunications facilities or radio. At the receiving end, reproducing equipment reconverts the encoded image signals by exposing photographic film or other sensitized paper. The term facsimile is often use with these products.

Still video equipment has recently become available from vendors such as Canon and Sony, and is again primarily used by the television and print media, although applications are expanding rapidly in such areas as insurance investigations and real estate transactions. A still video camera that captures a full color still video image can be reproduced using a special video printer that converts the still video image data into hard copy form. For applications requiring communication of the still video image, transmit/receive units are available wherein the image begins and ends as a video image.

The PhotoPhone from Image Data Corporation is an example of a specialty product that combines a video camera, display and storage facility in a terminal package. One terminal can send a real time or stored still video image to another for display or storage, or printing on special video printers. Again, the signal begins and ends as a video image.

Another example of a specialty product is peripheral equipment available for personal computers that enables the input/output, storage and processing of still video images in digitized formats. For instance, the Canon PV-540 is a floppy disk drive that uses conventional still video disks, digitizing and a still video image using a conventional format, and communicates with the computer through a standard communications I/O port.

U.S. Pat. No. 5,193,012 discloses a still-video to facsimile conversion system for converting the still-video image frame into a half-tone facsimile reproduction without having to store an entire intermediated gray scale image frame by repeatedly transmitting the still-video image frame from a still-video source to an input circuit with a virtual facsimile page synchronization module. This system permits image to facsimile conversion by utilizing a half tone conversion technique.

While the various prior art systems and techniques provide limited solutions to the problem of transmitting visual images via a facsimile transmission system, all fall short of providing a reliable method and apparatus for readily capturing, storing, transmitting and printing visual images in a practical manner.

An example of a system that addresses many of these problems is shown and described in the copending application having Ser. No. 09/006,073, filed on Jan. 12, 1998, and entitled: APPARATUS FOR CAPTURING, CONVERTING AND TRANSMITTING A VISUAL IMAGE SIGNAL VIA A DIGITAL TRANSMISSION SYSTEM. The system described therein provides the apparatus for capturing, compressing, converting, transmitting and receiving a facsimile using digital transmission techniques and protocols.

SUMMARY OF THE INVENTION

The subject invention is an image capture, compression and transmission system that is specifically designed to permit reliable visual image transmission over land lines or cellular communications using commercially available data transmission techniques. The preferred embodiment captures the high-resolution (640×480) full color images from any NTSC source like video cameras, monochrome image intensifiers, monochrome night visions devices (such as FLIRs) and the like. Depending on application, medium and low resolution may also be selected based on user selection. The system can be operated locally or remotely through the host interface software. In the remote mode, the image can be captured, stored and/or transmitted by remote "dial up" using land line telephone or cellular systems, or other communications systsems such as radio or the like. In the preferred embodiment, the system firmware may be loaded and accessed for troubleshooting via remote access as well.

The system of the present invention is specifically designed to operate over the public switched land line telephonic systems (POTS) and cellular services. The invention is designed with a hardware port for digital radio operation, as well.

Operating in correlation with a PC running WIN '95 or NT4.0 or the equivalent, the system of the present invention provides a complete imagery communication system for commercial communications networks, providing a versatile remote imagery terminal for radio, cellular or land line based telephone systems. The preferred embodiment of the invention is fully compatible with and integrates with a standard AMP cellular phone such as by way of example, a Motorola flip phone, and supports NTSC monochrome composite and S-video sources including video cameras, camcorders, VCRs, still image cameras, image intensifiers and FLIR-night vision devices. In the preferred embodiment, all of the circuitry for the system is on a card or slice which is inserted between the battery pack and the body of a standard Motorola cellular phone. Full isolation of the system circuitry is provided, permitting power preservation for cellular telephone use when data transmission is not activated.

The present invention, permits a still frame visual image to be captured at a remote location and either stored locally or sent immediately, over land line or wireless communication systems, to a remote location such as, by way of example, a computer system wherein the image could be merged directly into newsprint. The image may also be printed as a hard copy using any Windows based printer or Group-III facsimile machine, anywhere in the world. Where desired, the images may be stored in memory for later recall, and may be archived on a portable medium such as a memory card or the like. In addition to multiple resolution capability, the system may be used with multiple compression algorithms such as JPEG, wavelet and other compression schemes.

In the preferred embodiment of the invention, the controller is programmed to permit smart addressing of the video RAM, allowing for row or column access to the image data, decimation and non-linear, sequential pixel access.

The system of the subject invention is particularly useful for applications where immediate transmission of visual images are desirable and sophisticated equipment is not always available for receiving the information. The system also provides a unique and reliable means for transmitting visual data from remote locations, such as, by way of example, construction sites, law enforcement and emergency vehicles and the like.

It is, therefore, an object and feature of the invention to provide an apparatus for capturing, converting and transmitting a visual image over land line or wireless telephone systems, such as cellular, or private wireless radio systems.

It is another object and feature of the invention to provide an apparatus for compressing the visual image data in order to minimize the capacity requirements of the data capture and storage system and to minimize the transmission time over the transmission media.

It is an additional object and feature of the invention to provide an apparatus for capturing converting and transmitting images over other wireless transmission systems such as radio and satellite.

Other objects and features will be readily apparent from the drawings and detailed description.

DETAILED DESCRIPTION OF THE PREFERRED EMBODIMENTS

The image capture and transmission system of the subject invention is suited for capturing a single frame analog image signal and transmitting the captured signal via either a cellular or land line telephone system. The preferred embodiment is shown and described and is particularly well suited for use in combination with a standard Motorola flip phone. The camera is not part of the system and the image captured by the camera is introduced into the system via standard cable, as will be described.

Figures 1, 5A:
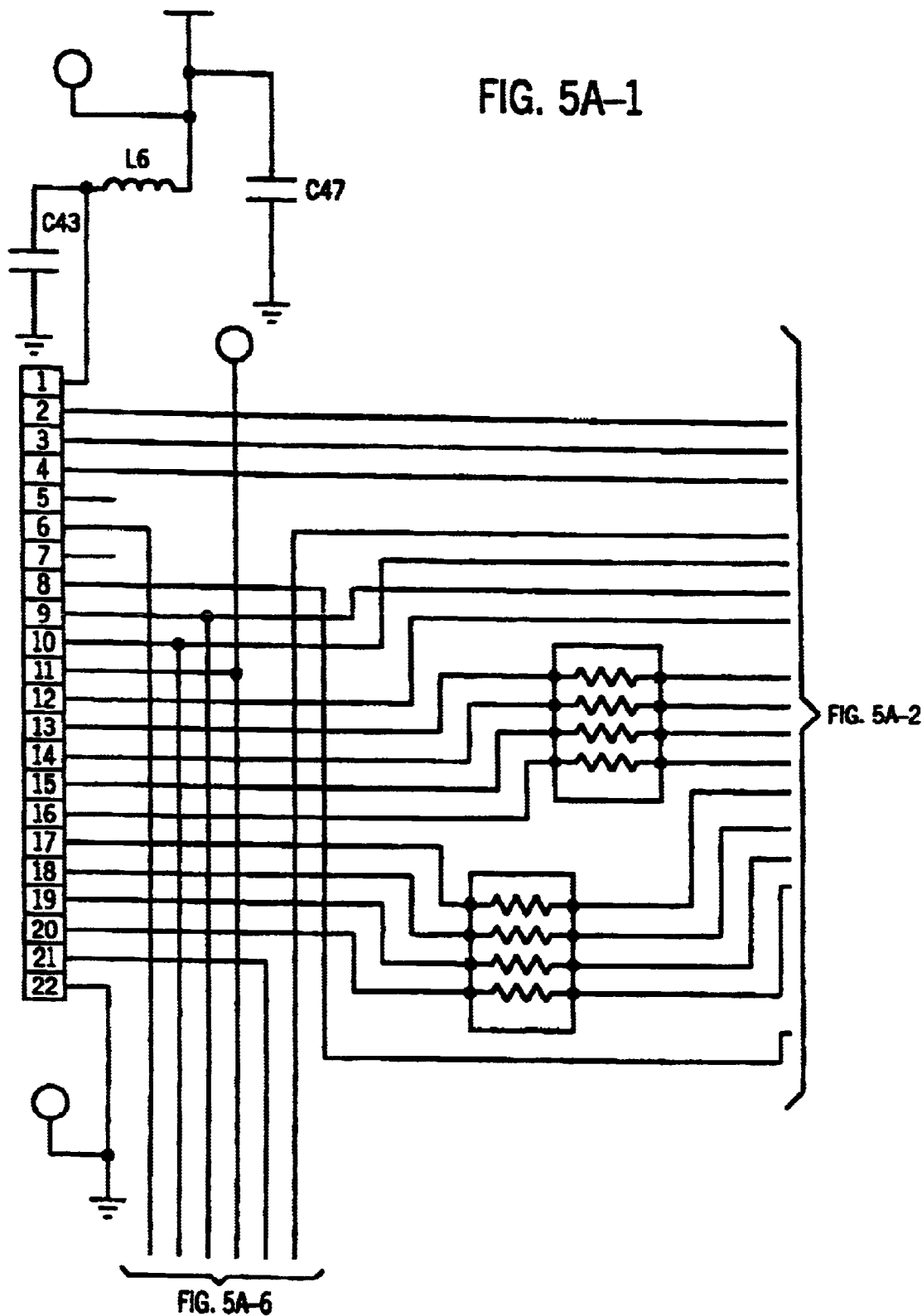
FIG. 1 is a perspective view of a typical hand held cellular telephone with the image transmission system of the subject invention integrated therein.
Figures 4, 5A:
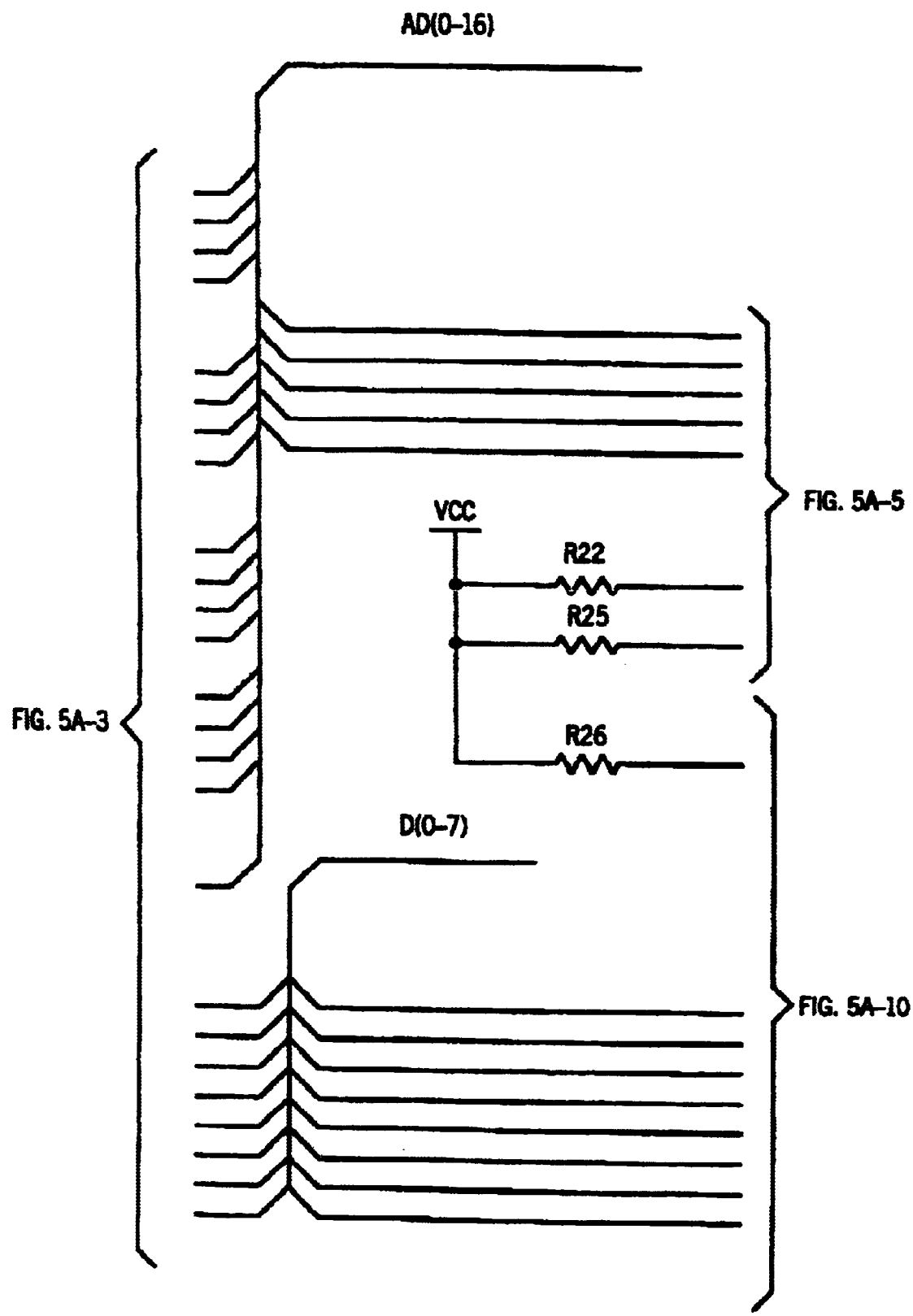

Turning now to FIG. 1, a hand held cellular telephone 10 is shown with the image transmission system 12 mounted integrally therein. A standard Motorola FlipPhone® is shown. However, it will be readily understood by those who are skilled in the arts that the invention can be readily adapted to other telephone configurations. The cellular telephone includes a flip cover 14, and LED panel 15, a keypad 16 and an antenna 18, as is standard. The battery pack 20 is normally secured directly to the phone body 11. In the preferred embodiment of the invention, the transmission system 12 is inserted between the battery pack 20 and the body 11, as shown. The battery pack 20 provides the power for both the telephone and the transmission system. The standard connectors between the battery pack and the phone body are utilized to couple the transmission system 12 to the standard battery pack and the phone. The cable 22 and connector 24 are used to connect the system 12 and phone 10. The connector 24 is connected to the phone via the standard phone hands free (or data) port 25. The various control buttons, status readouts and ports for operating the transmission system 12 with the telephone 10 are located on the opposite side panels 26 (FIG. 1) and 28 (FIG. 2) of the transmission system housing.

Figure 3:
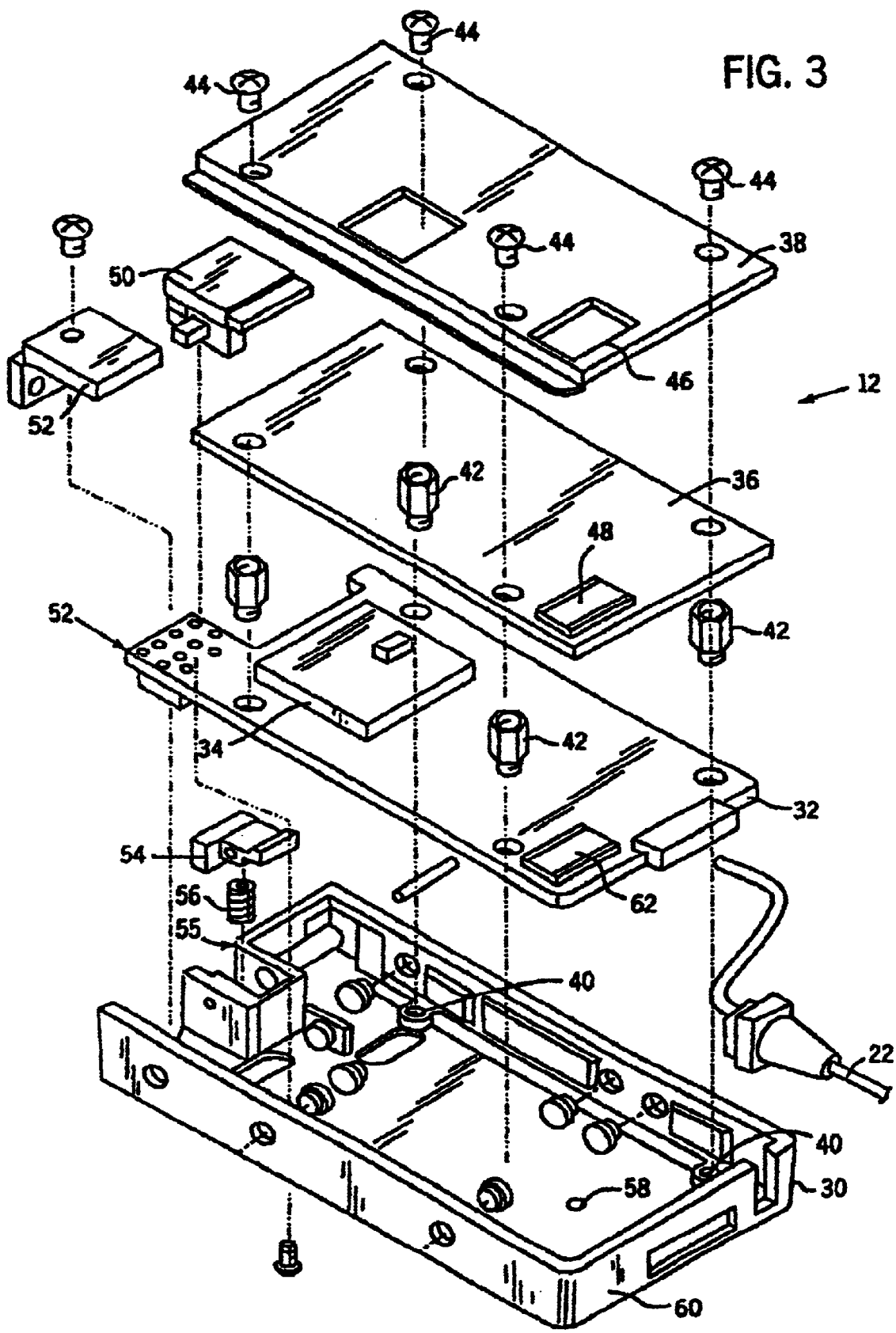
FIG. 3 is an exploded view of the assembly for the preferred embodiment of the subject invention.

An exploded view of the assembly of the image facsimile transmission system 12 of the present invention is shown in FIG. 3. The housing 30 is an open topped box of standard construction, typically an unitary member of high impact plastic or similar material. The housing may be custom molded in the well known manner. Seated in the housing 30 is the processor board 32, containing the processor 34 and other circuitry, as more fully shown in block diagram form in FIG. 4. The modem board 36 is placed over the processor board 32. The housing cover 38 fits over the entire assembly and sits on the top edges of the sidewalls of the box 30 to close the unit. The processor board 32 is seated directly on pads 40 provided in the box and held in place by standoff screws 42. The modem board 36 is seated directly on the stand off posts 42 and the cover 38 is placed over the modem board 36. The assembly is then secured in assembled relationship by screws 44. A window 46 provides an opening in alignment with the power connectors on the telephone 10, permitting the power interface 48 mounted on board 36 to communicate directly with the cellular telephone 10. Also mounted on the modem board 36 is a RJ-11 switch 50 for switching between POTS and cellular or radio and an insulated mini-phono jack 52 for video input and remote trigger signals.

The landline hook-up can be used whether or not the system is installed on the cellular telephone 10. A latch 54 is installed in the latch recess 55 provided in the box 30, and is spring loaded in the latched position by spring 56. The latch 55 permits the entire assembly to be secured to the flip phone 10 in the same manner as the battery pack 20 would be secured in a non-modified phone configuration. The battery pack 20 is mounted on the outside of the bottom 58 of the box 30, with the power connections being interfaced to the phone 10 via the interface window 60 in the box 30, and interface circuitry 62 in the processor board 32 and 48 in the modem board 36. The displays and control button switches are mounted in openings provided in the side walls of the box 30, as better seen in FIGS. 1 and 2.

Figures 5, 5A, 6:
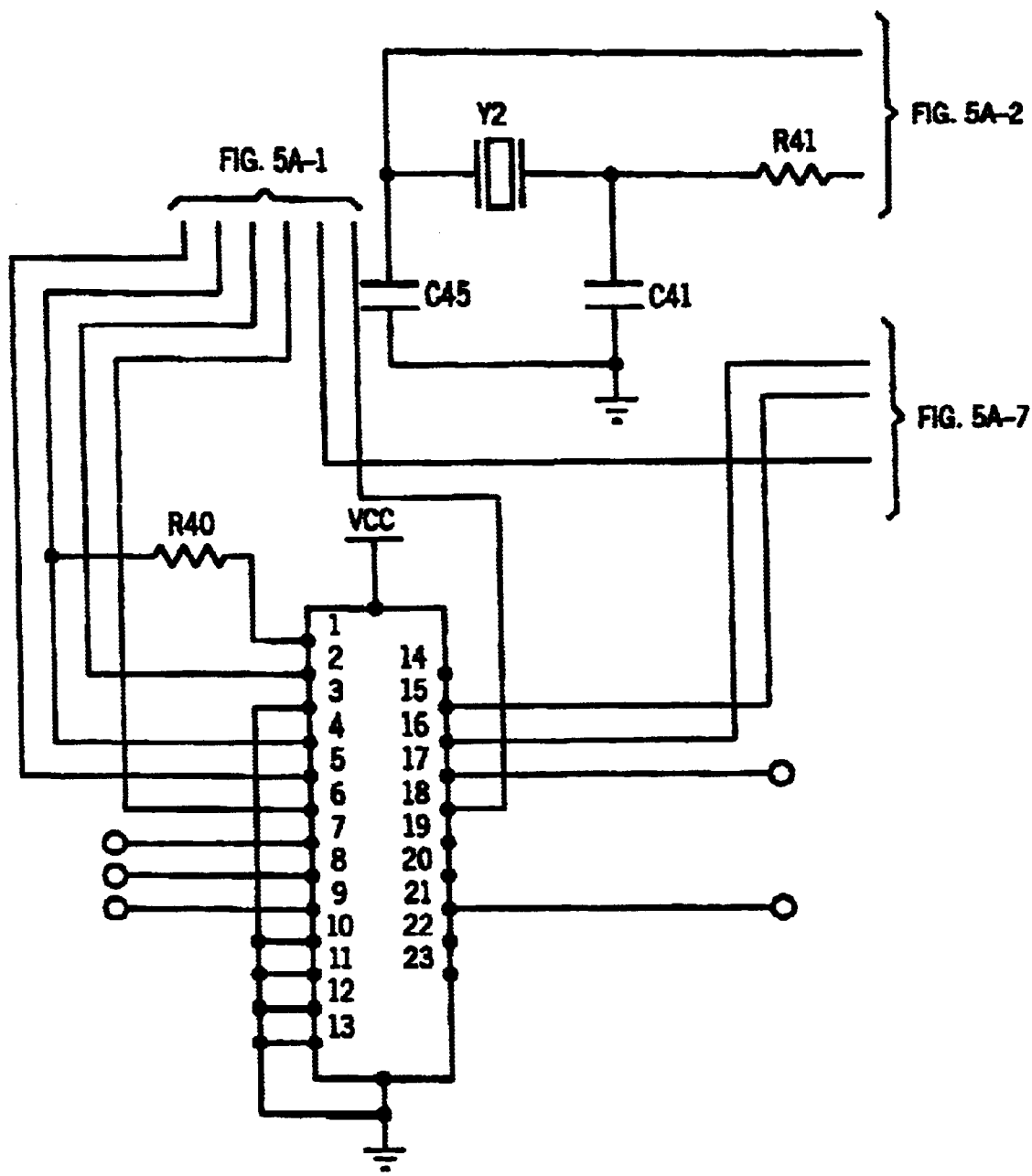
FIG. 5 is a schematic diagram of an exemplary embodiment of the subject invention.
Figures 5, 5A, 6, 7:
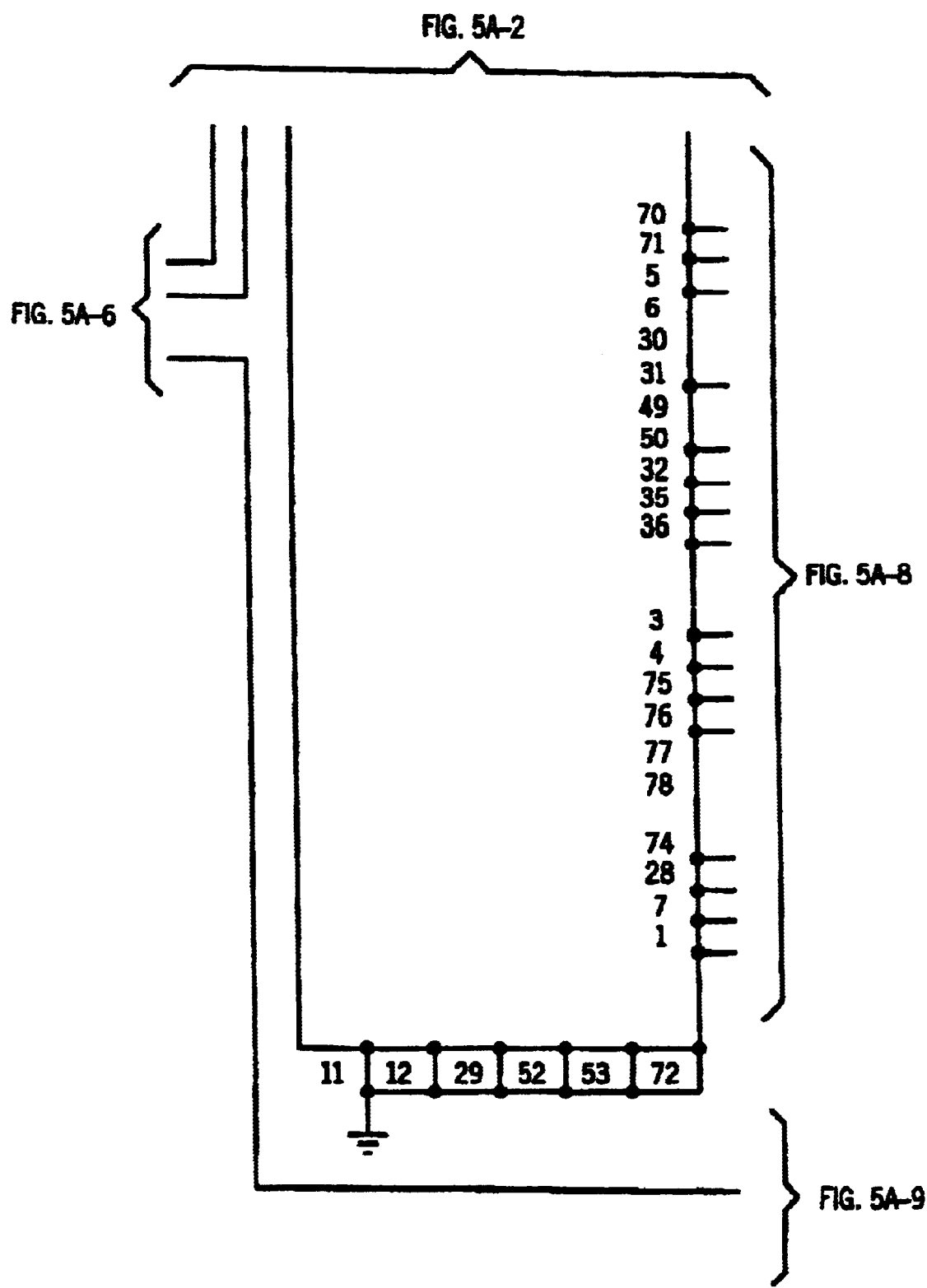
Figures 5, 5A, 6, 7, 8:
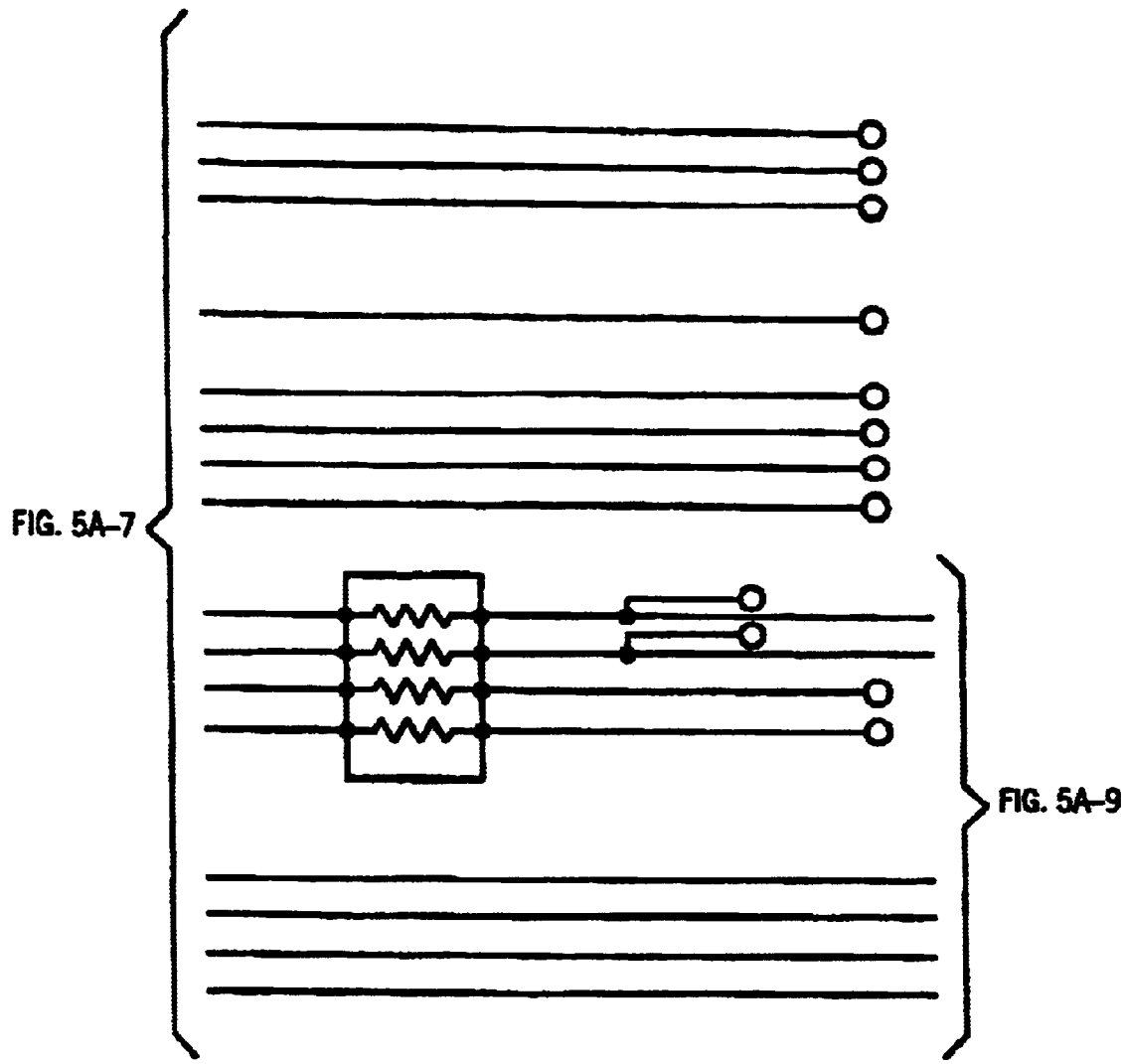
Figures 5, 5A, 6, 7, 8, 9, 10, 11:
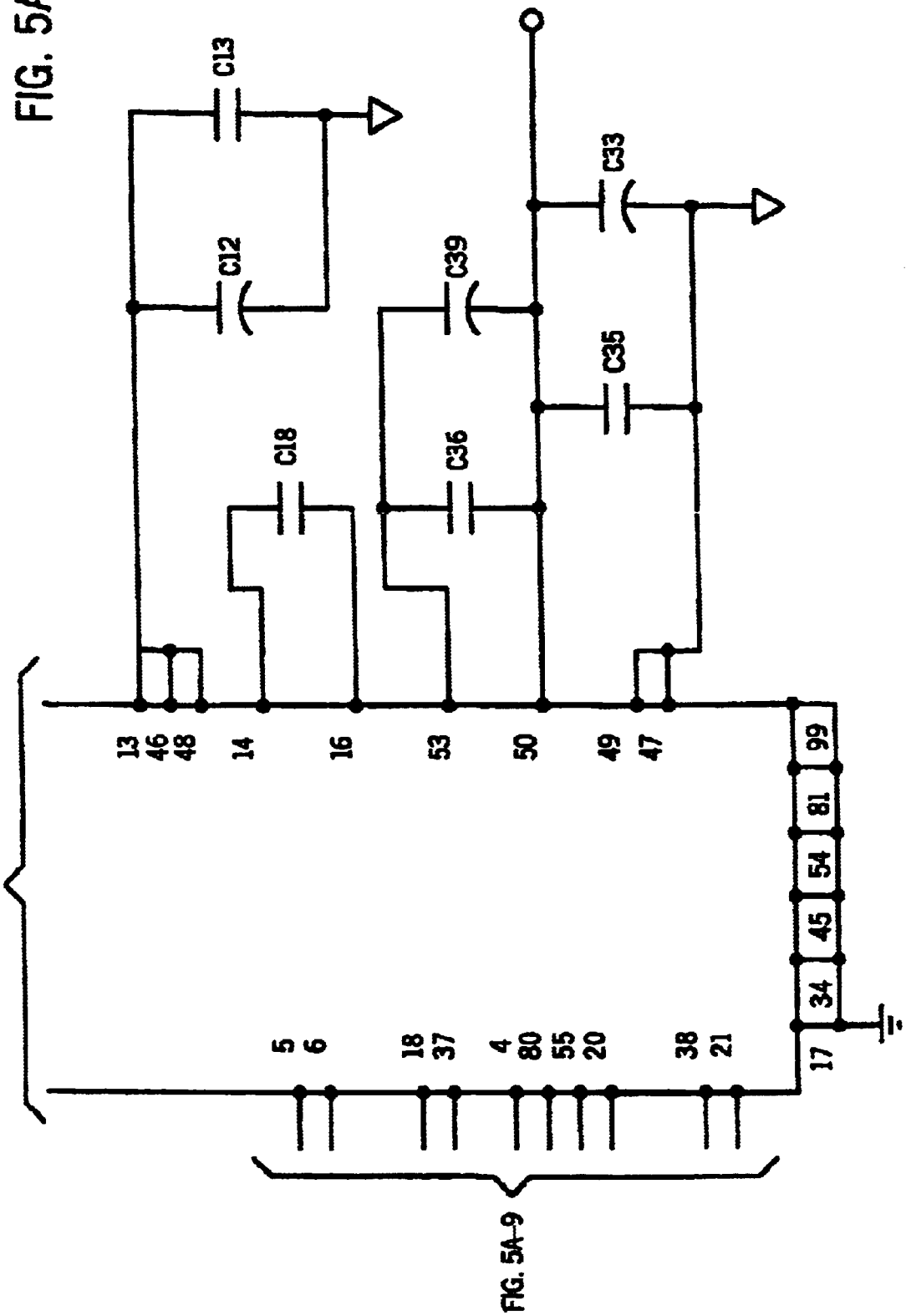
Figures 2, 5C:
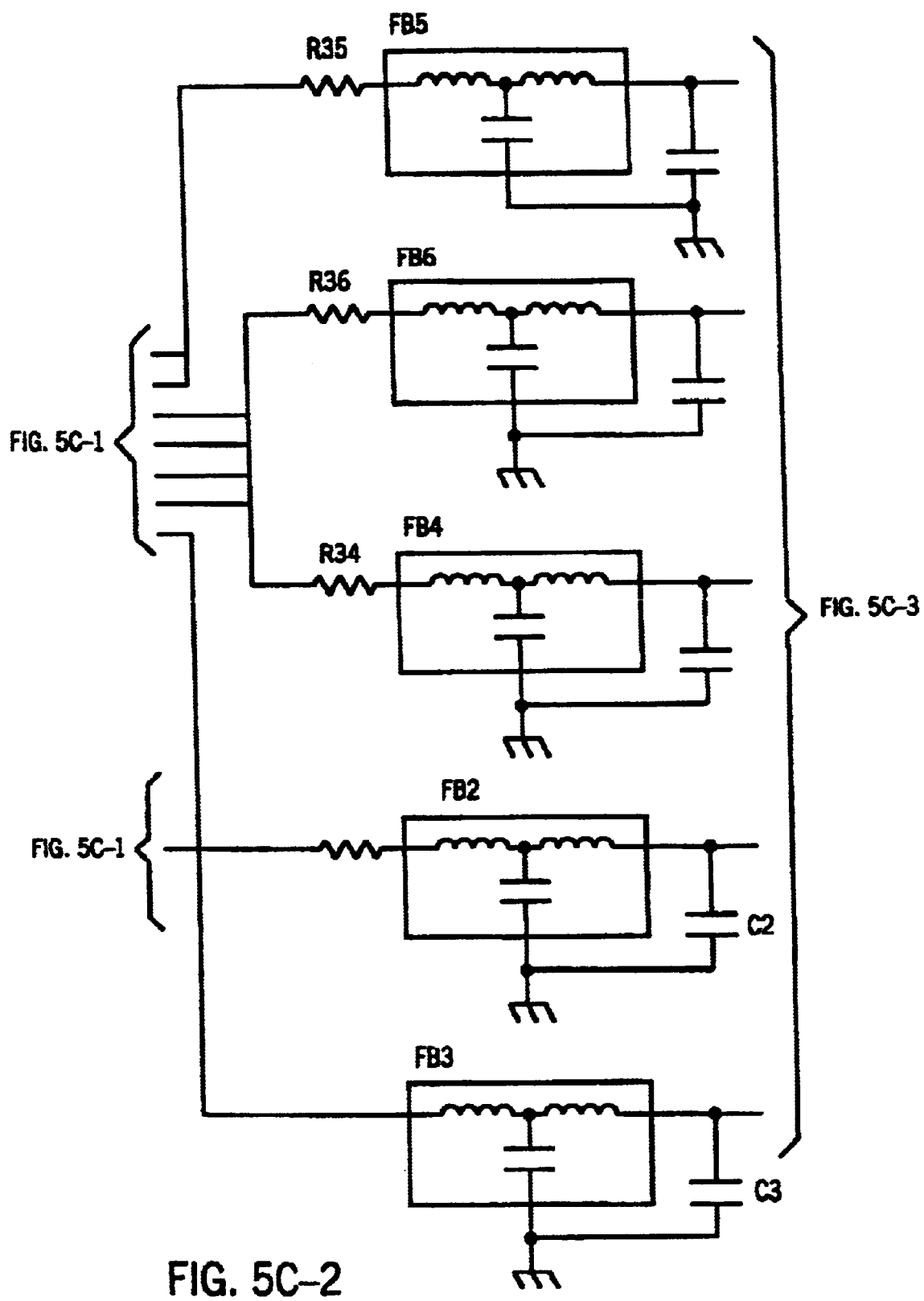
FIG. 2 is a side view of the transmission system, showing the side not visible in FIG. 1.
Figures 3, 5C:
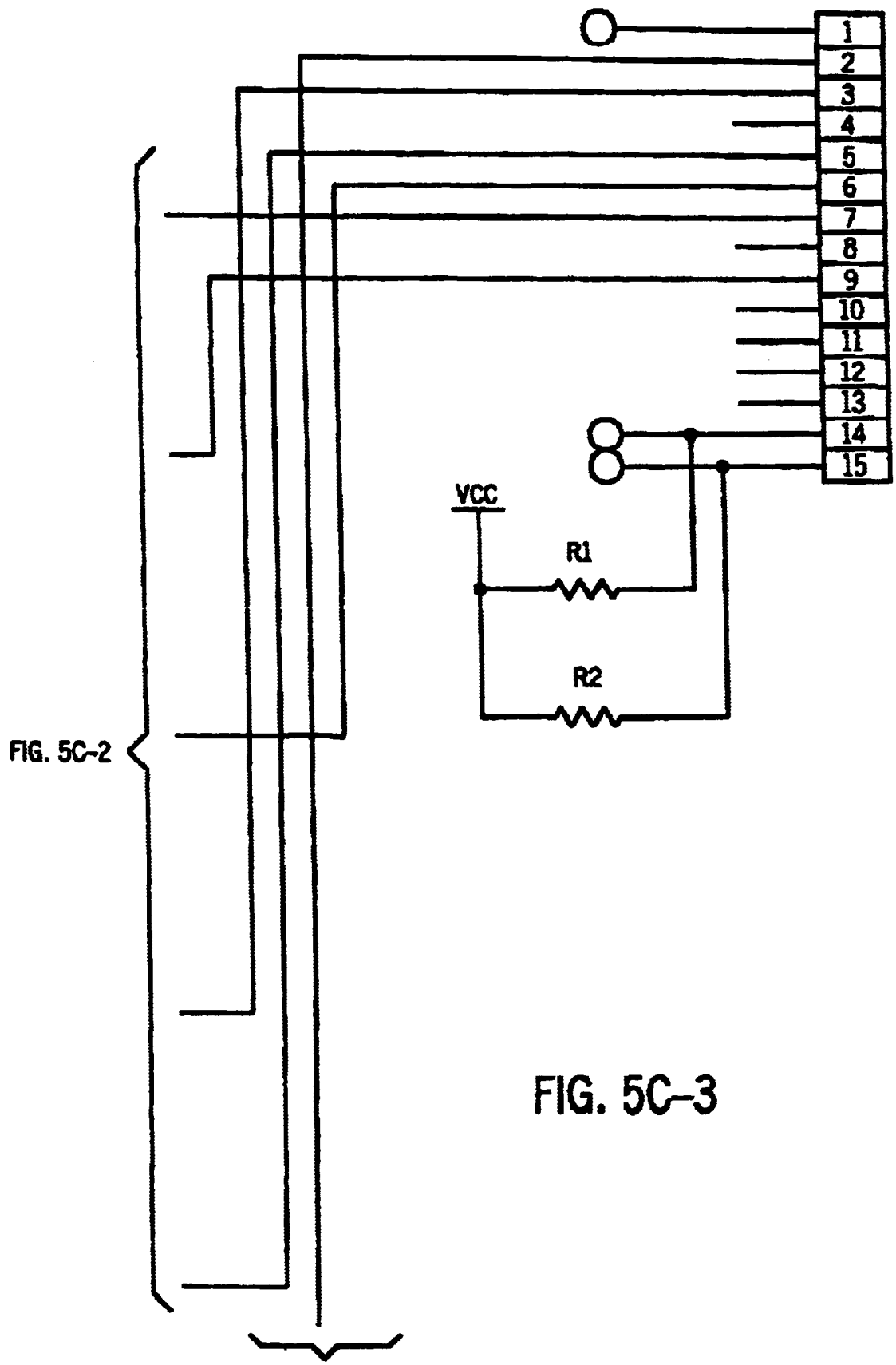
Figures 5, 5C:
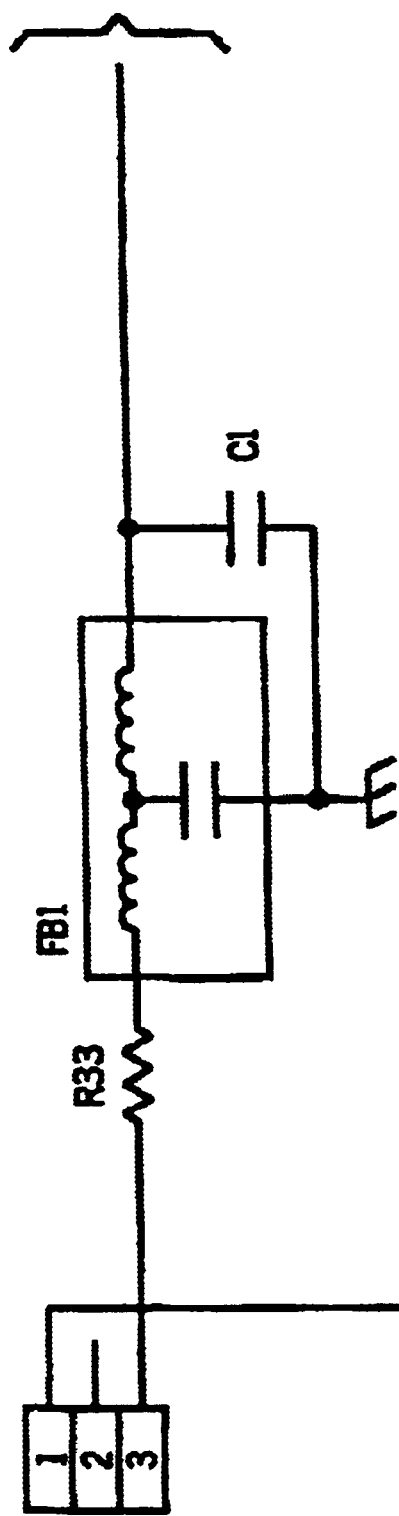
Figures 1, 5D:
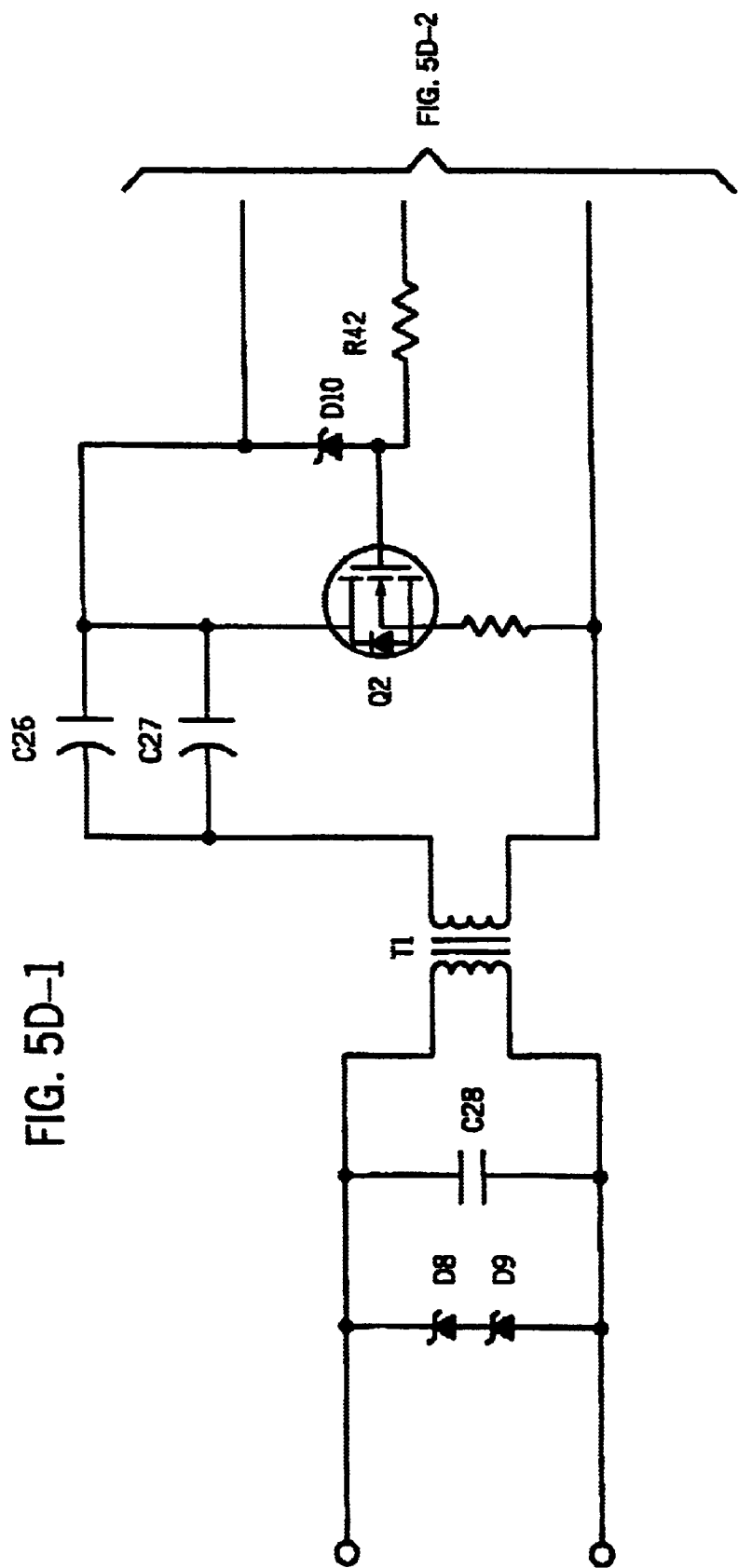
Figure 5D:
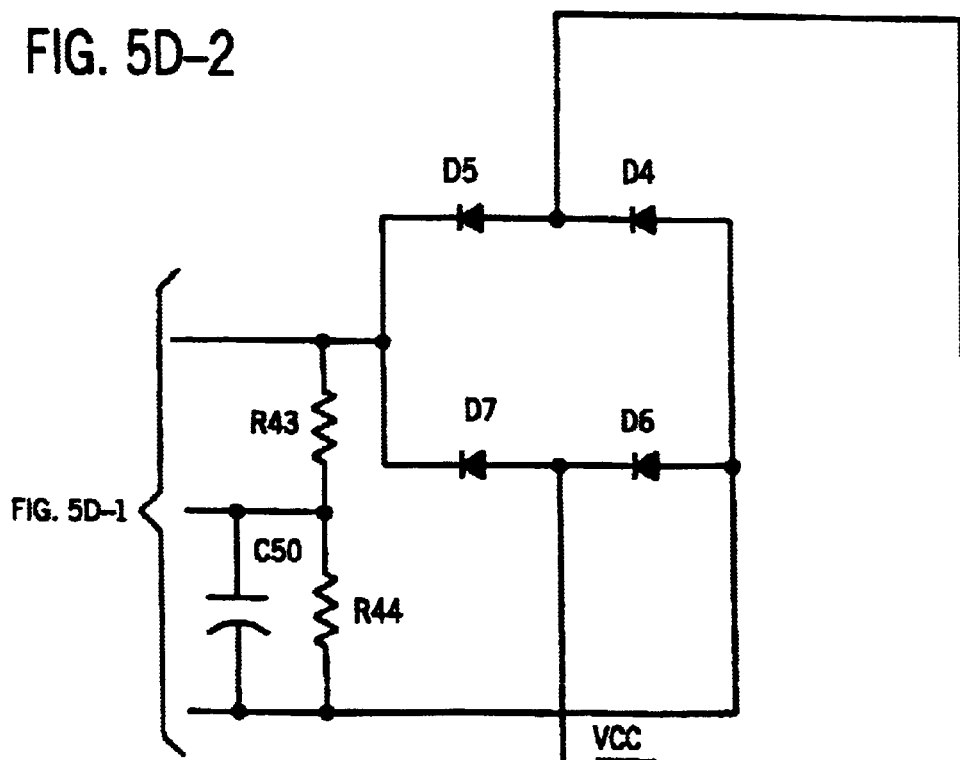
Figure 2:
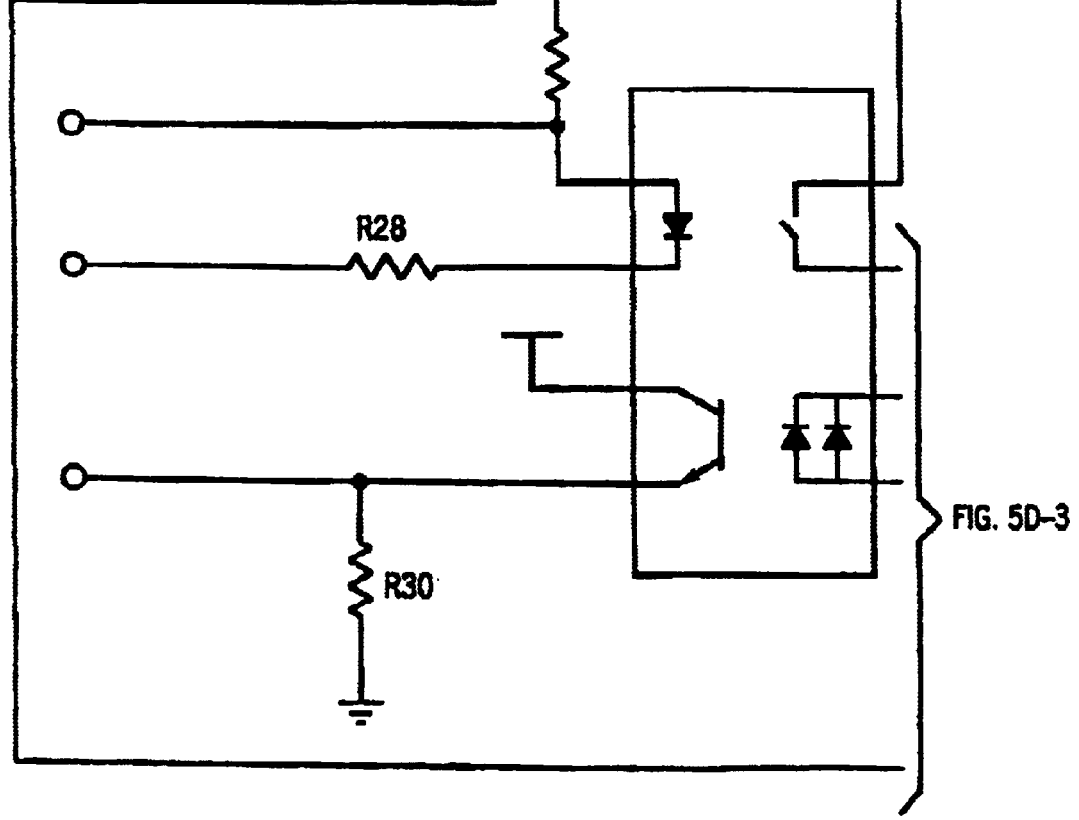
Figures 3, 5D:
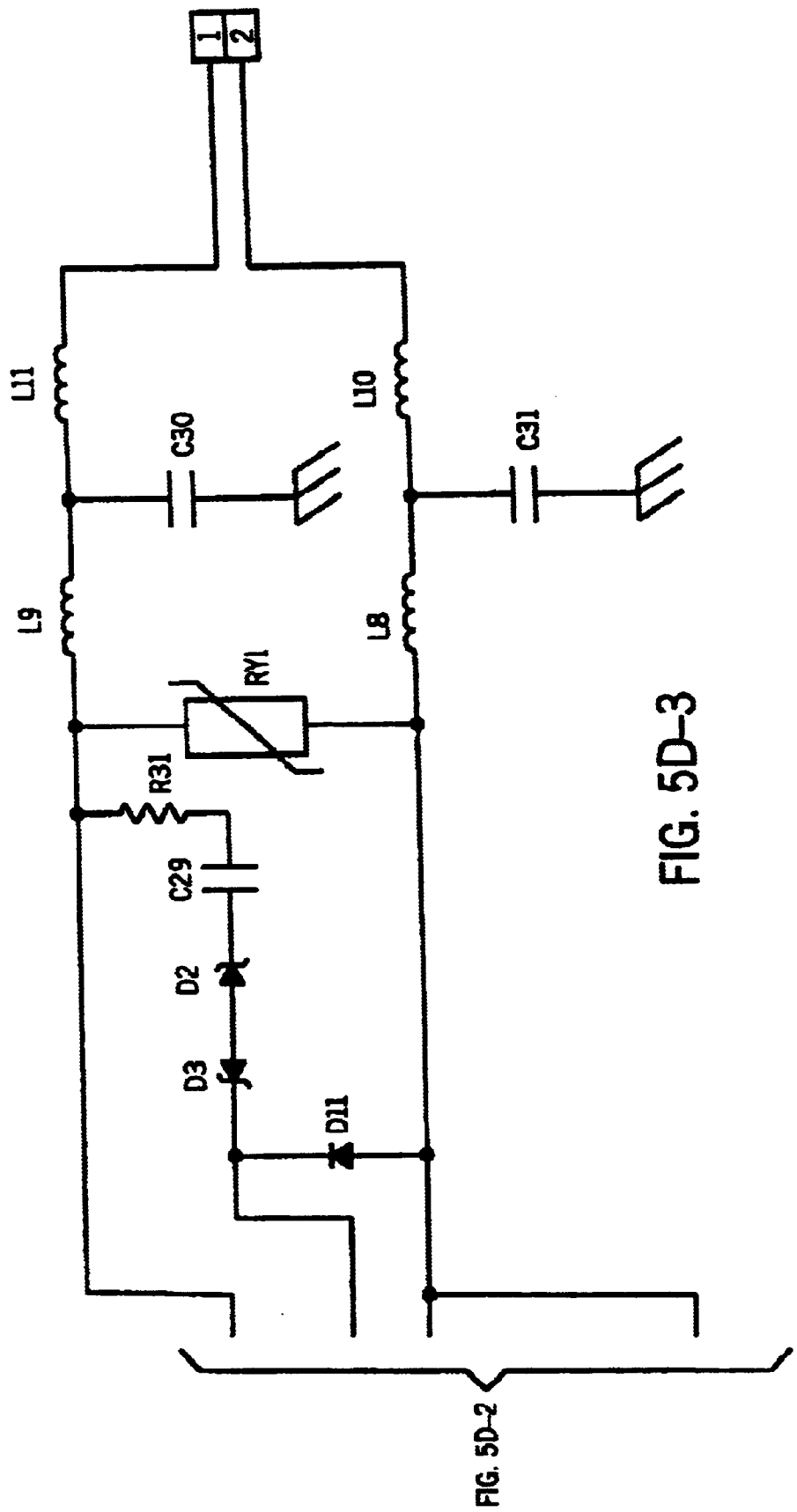
Figures 1, 5E:
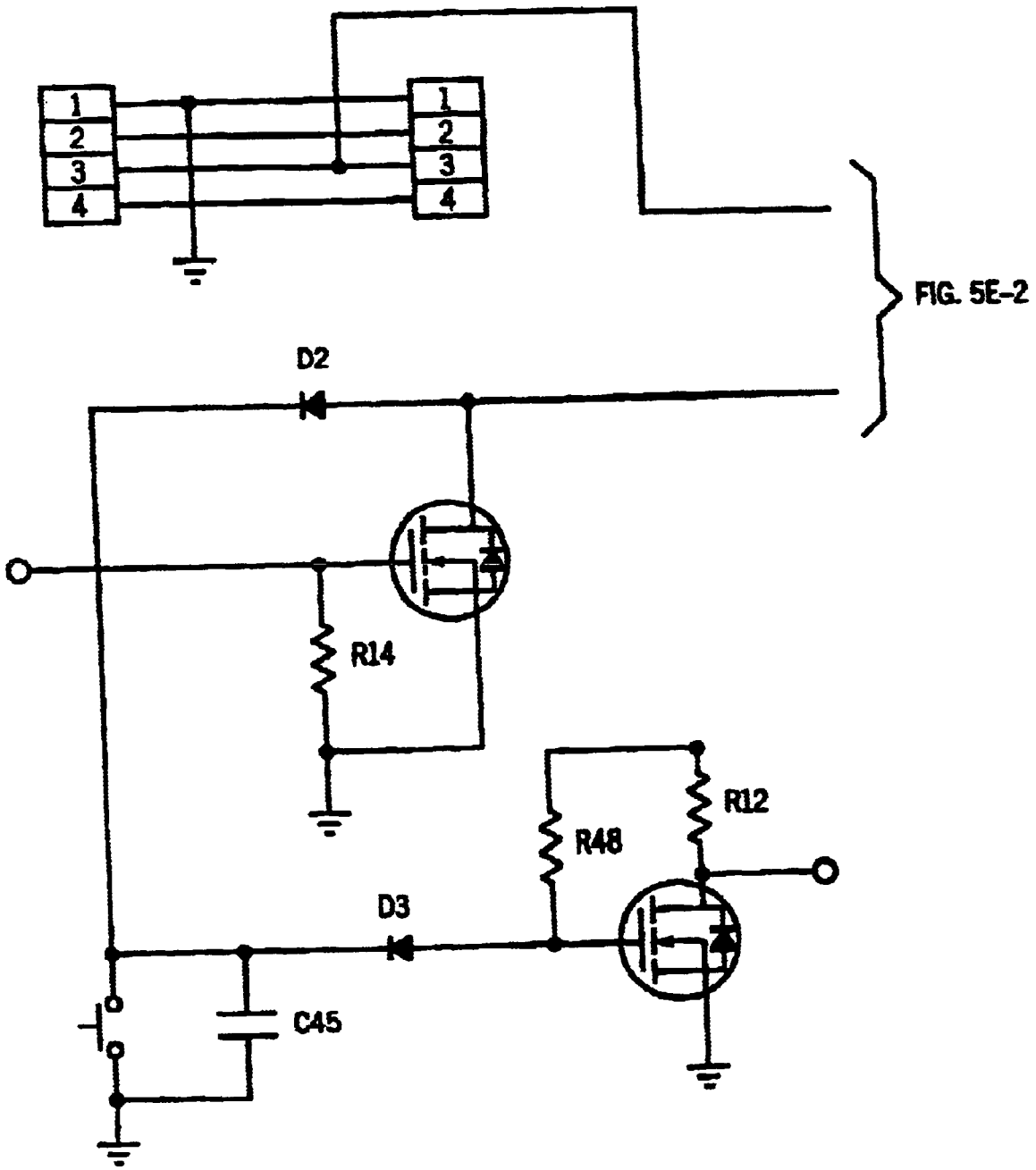
Figures 2, 5E:
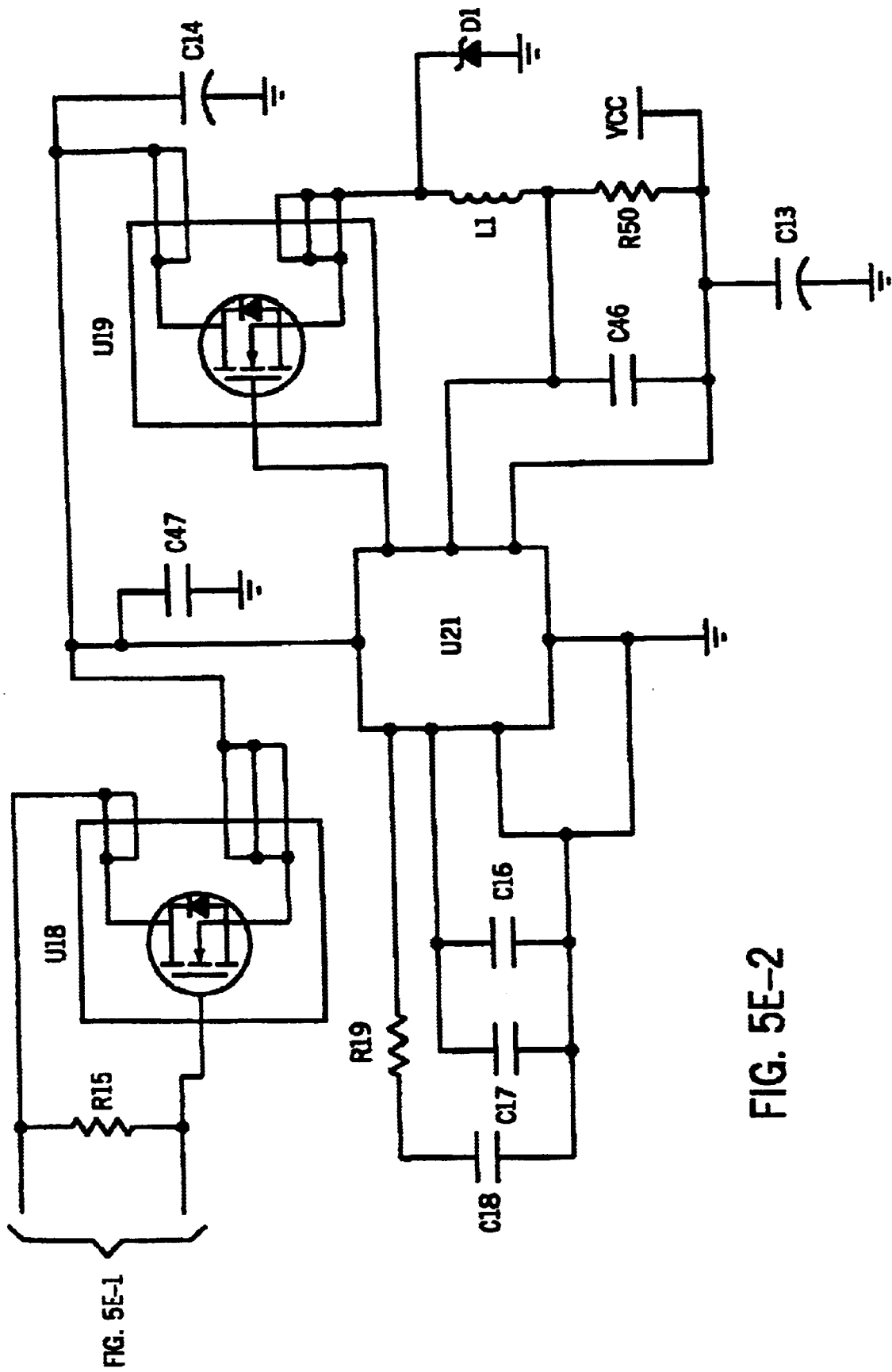
Figures 3, 5E:
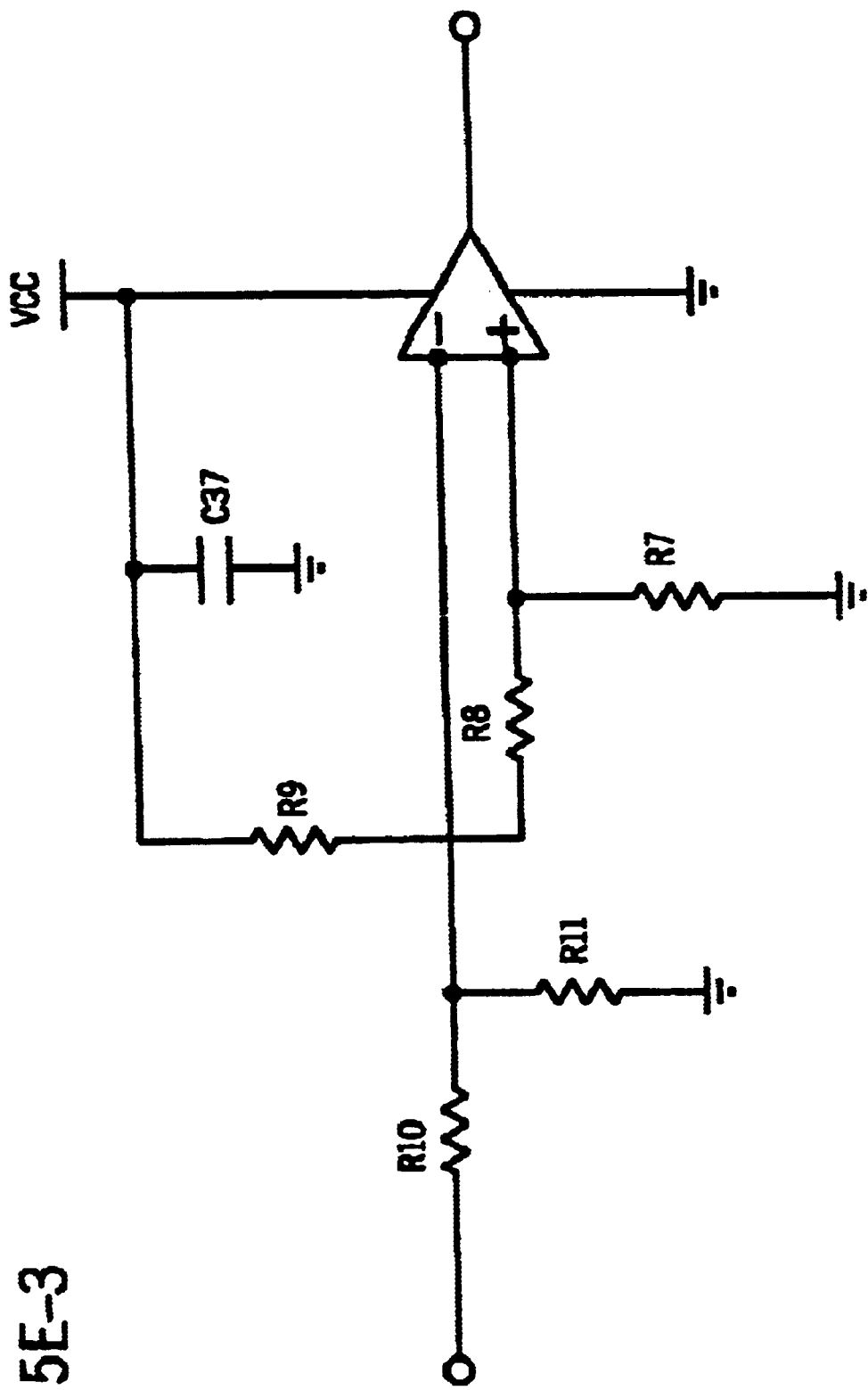
Figures 4, 5E:
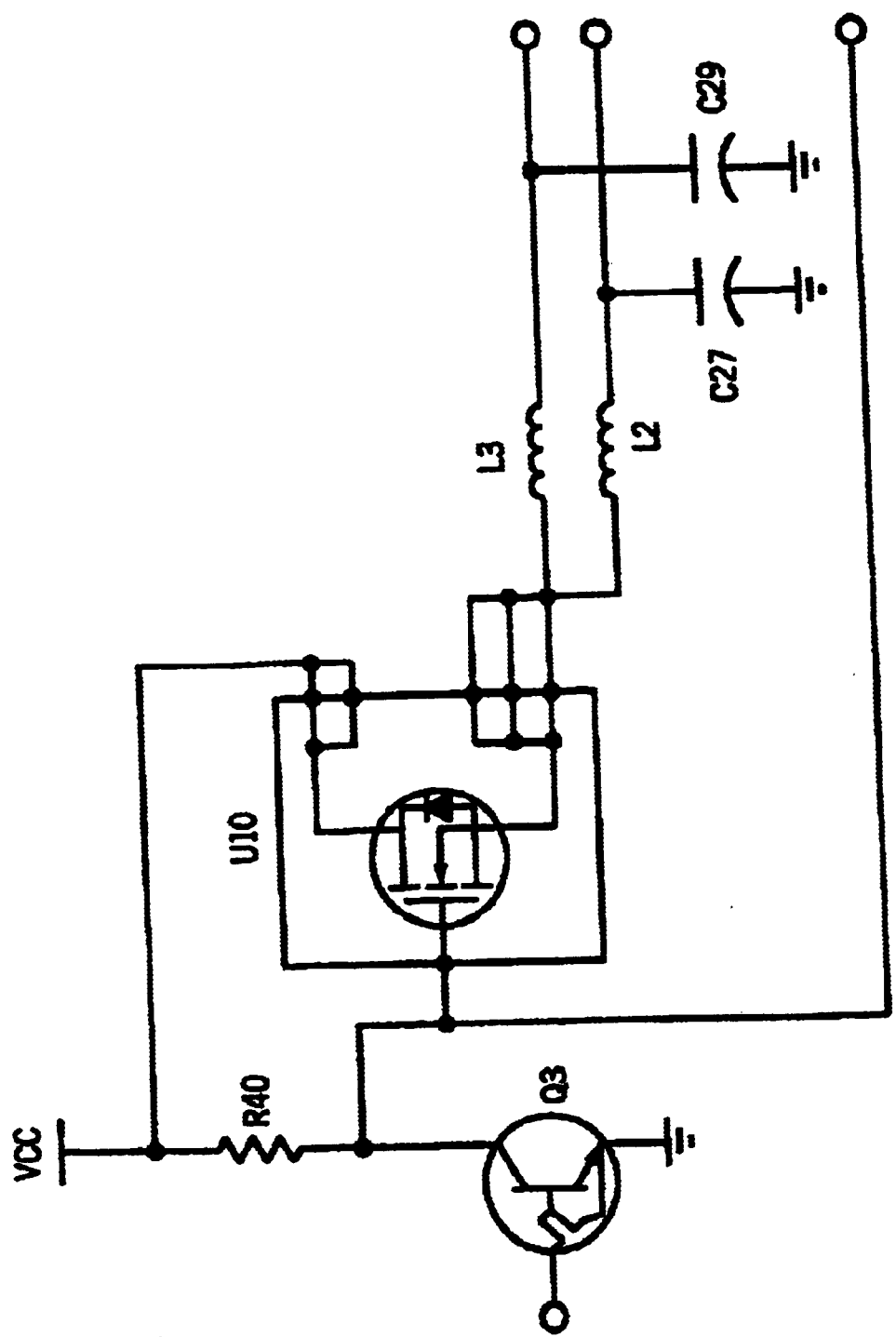
Figures 2, 5F:
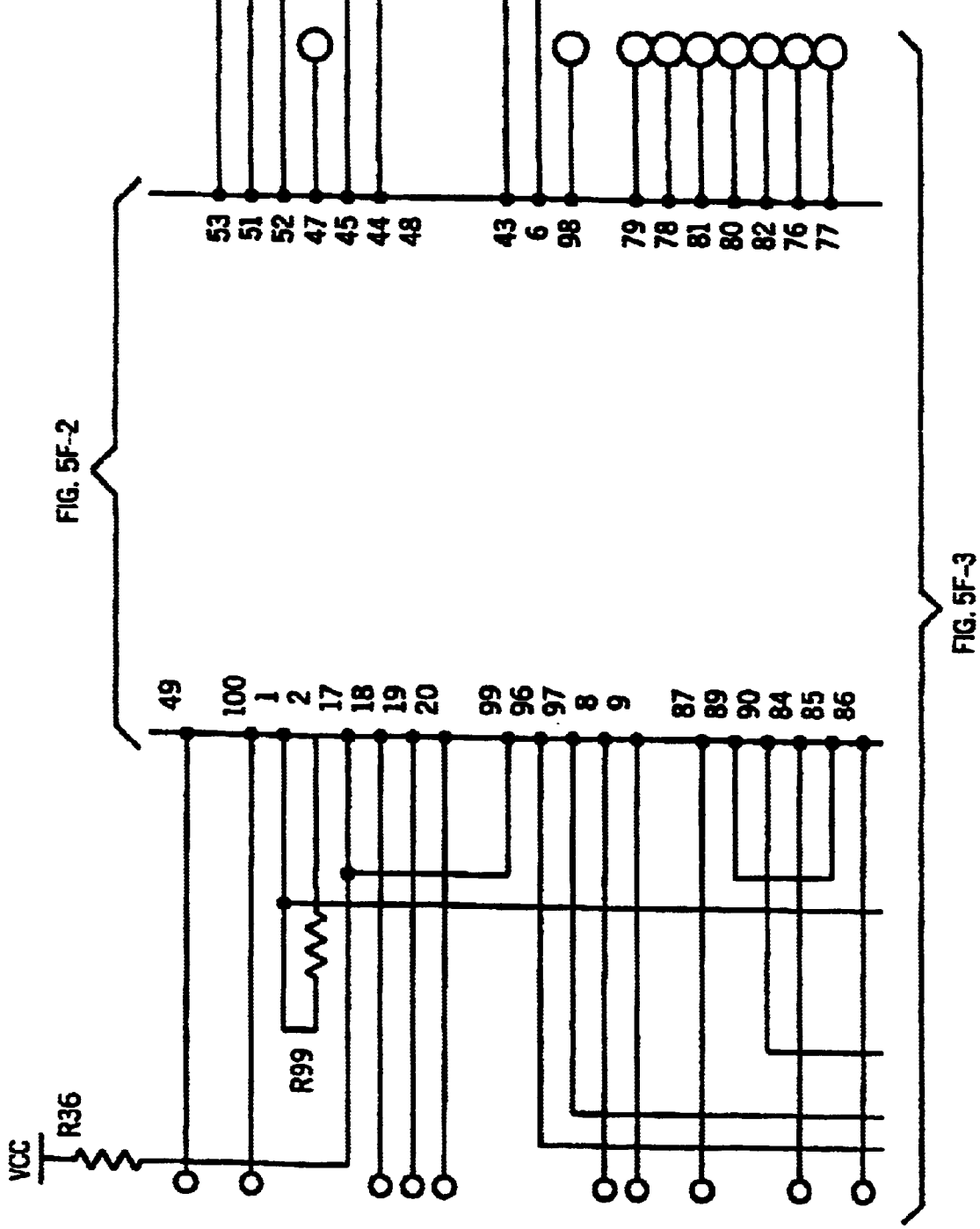
Figures 3, 5F:
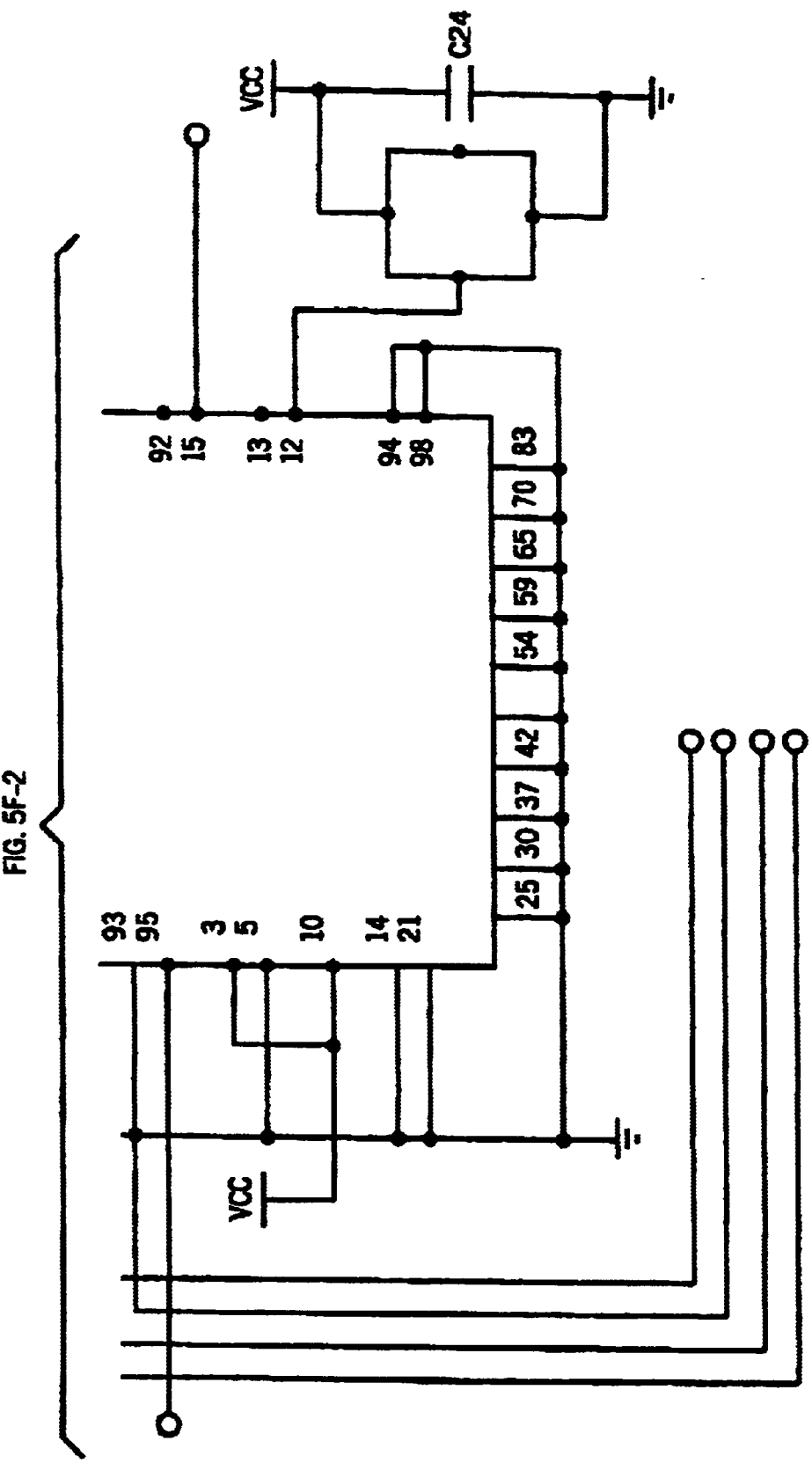
Figures 1, 5G:
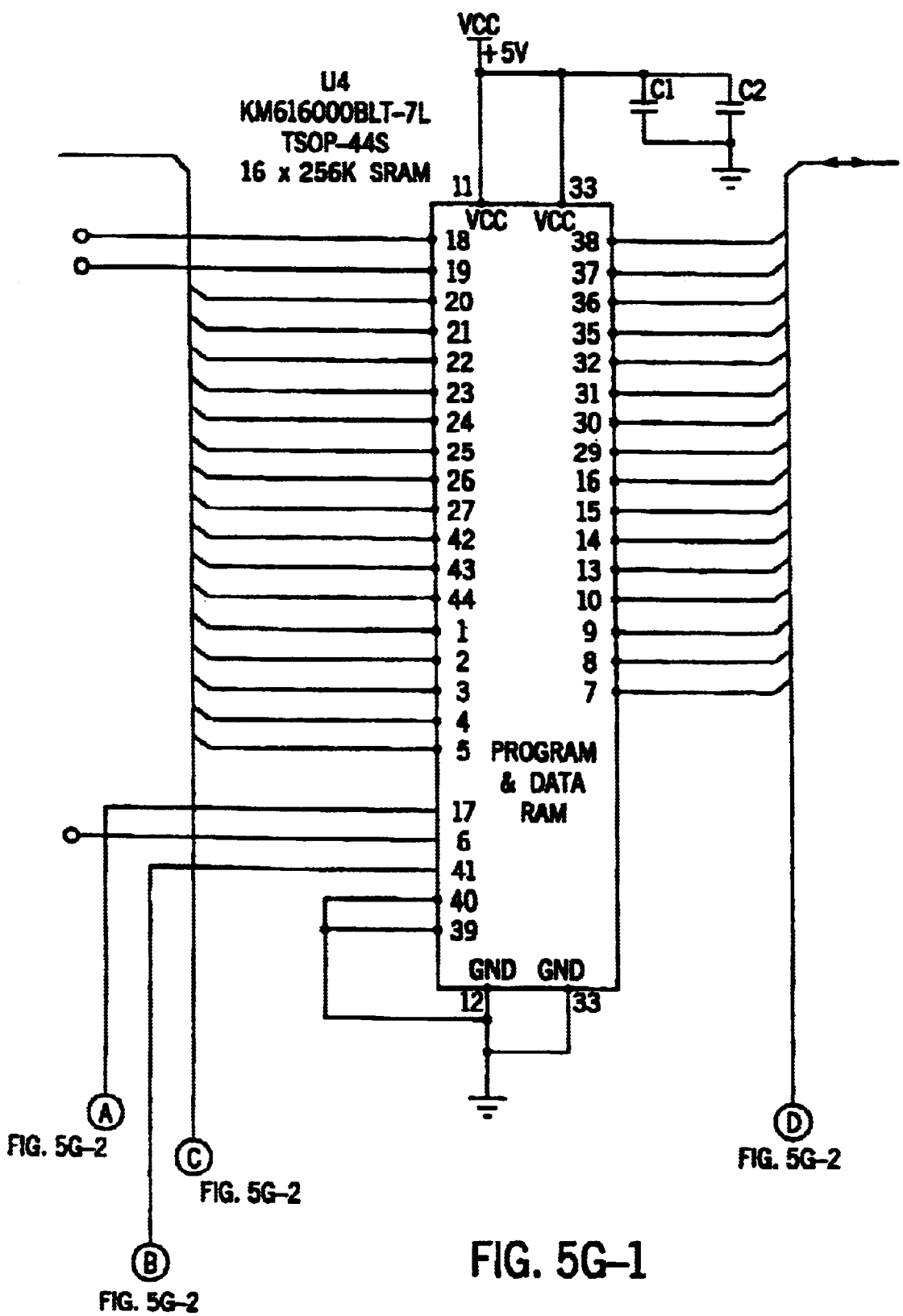
Figures 2, 5G:
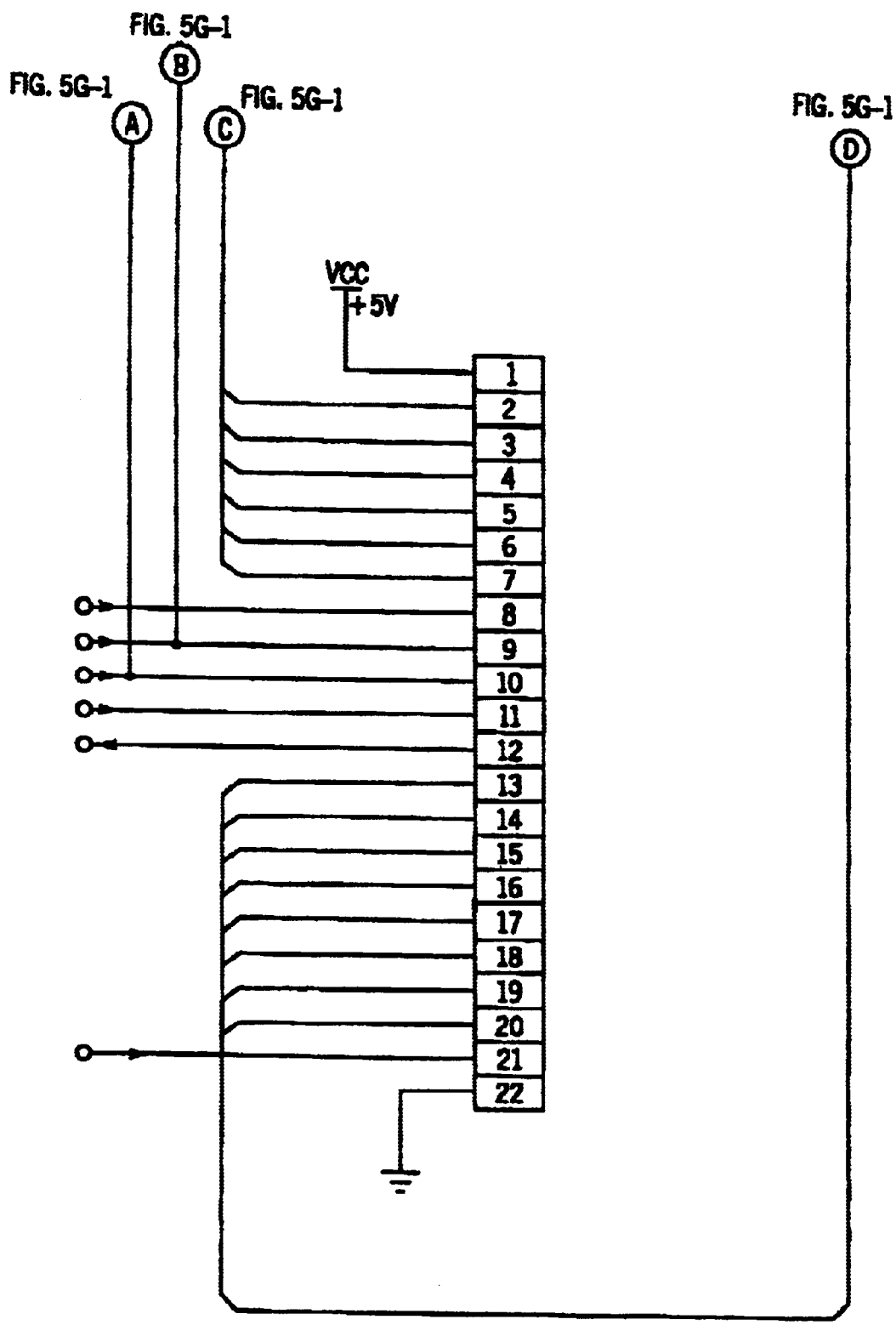
Figures 1, 5H:
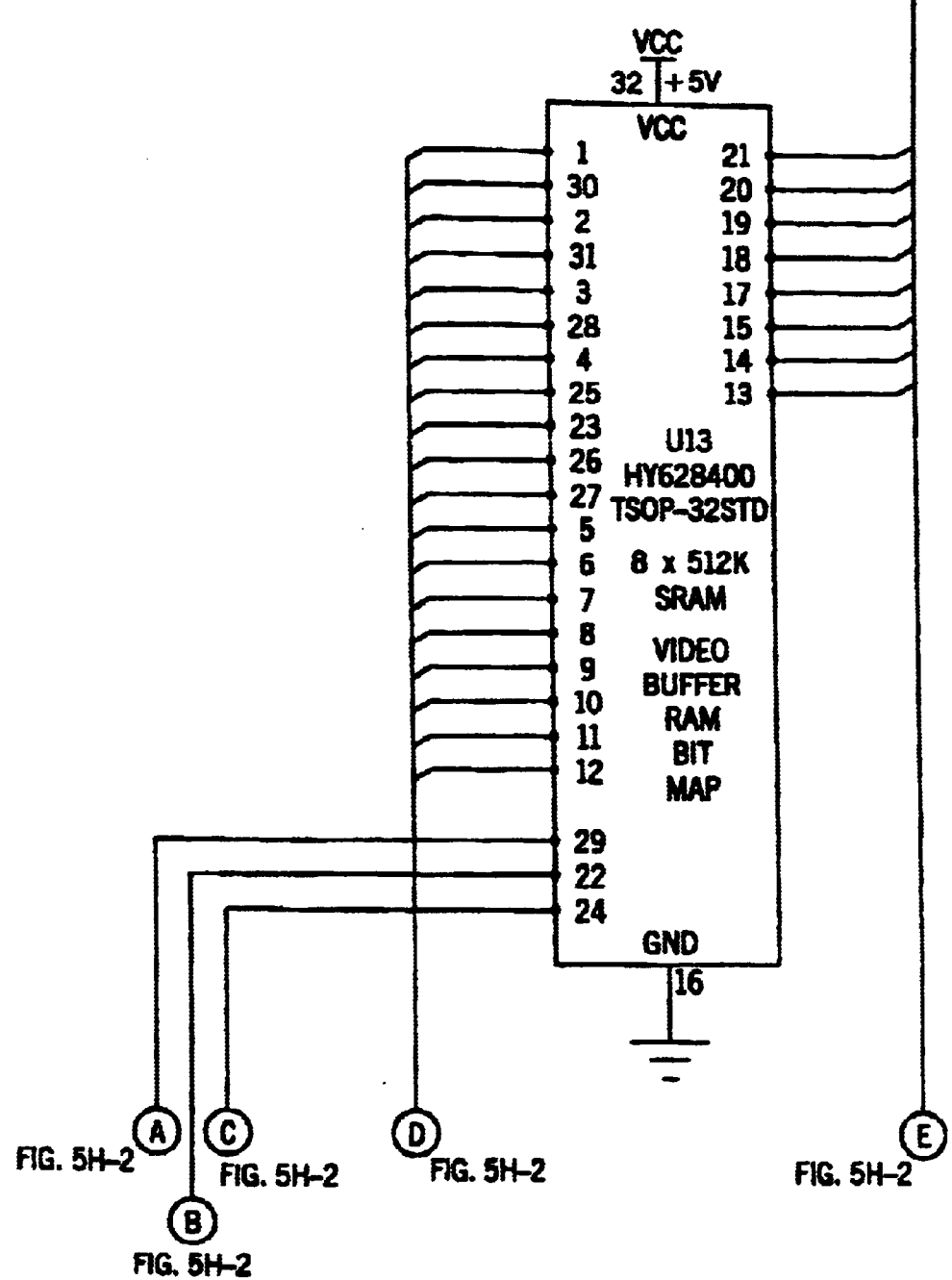
Figures 2, 5H:
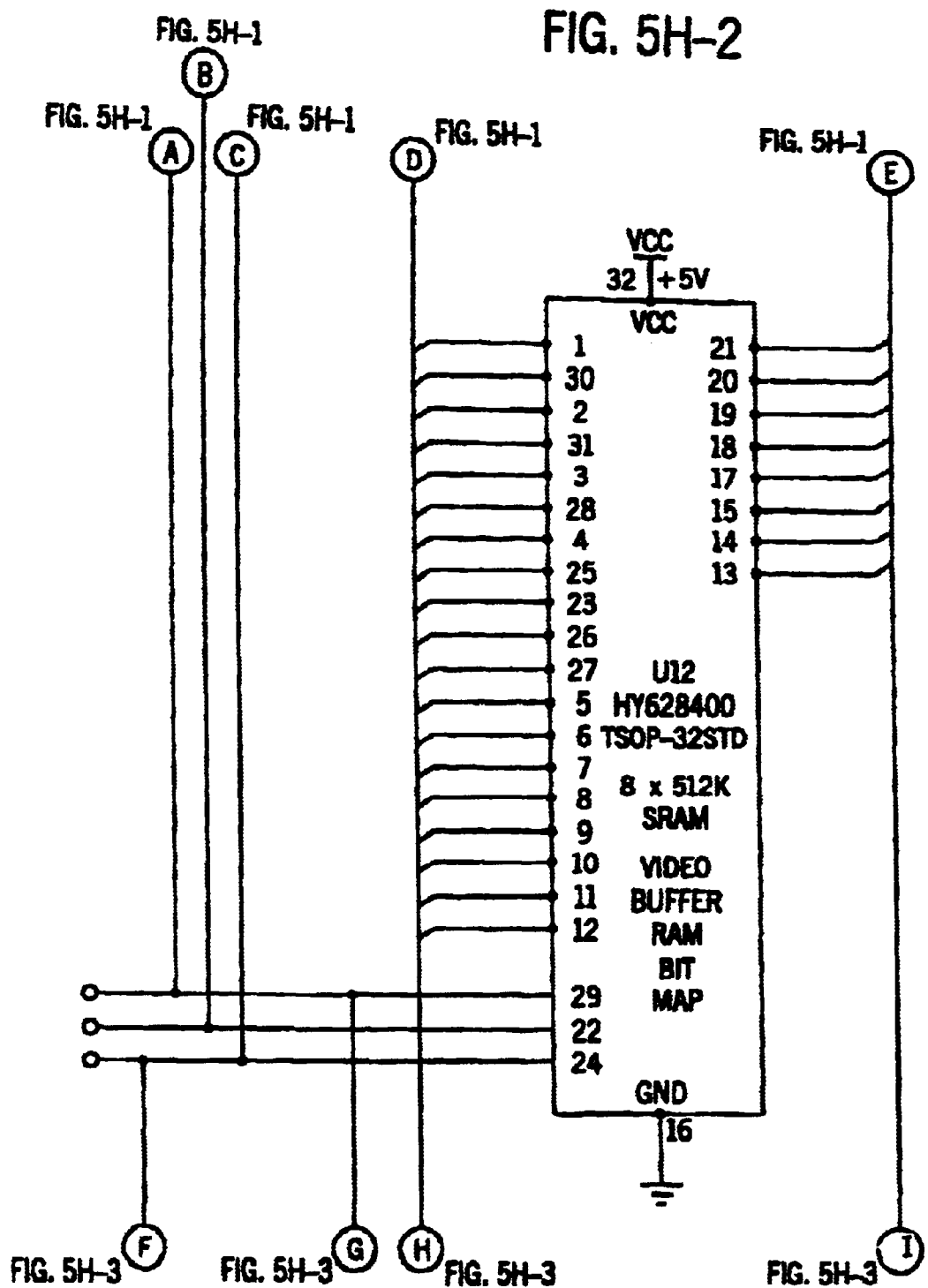
Figures 3, 5H:
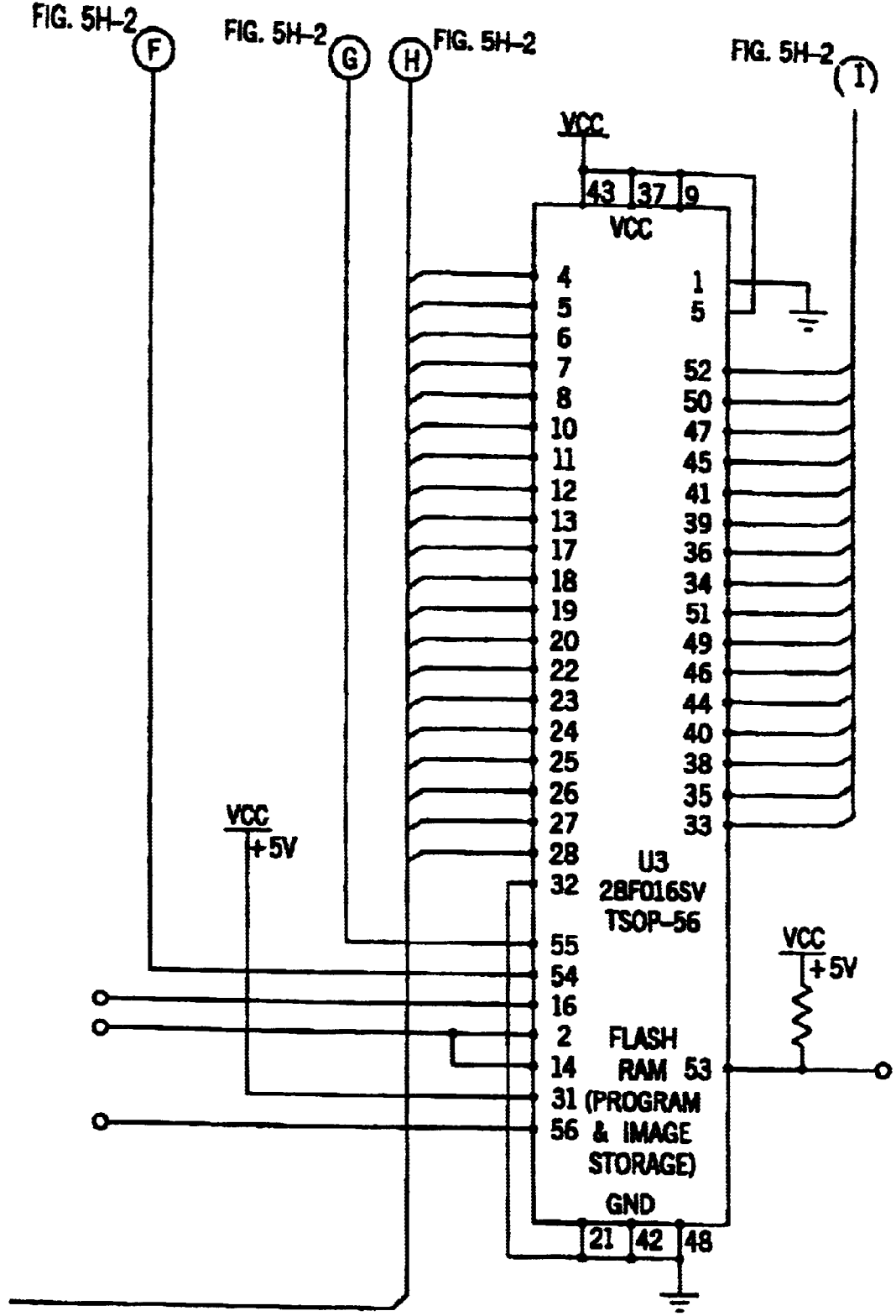
Figures 3, 51:
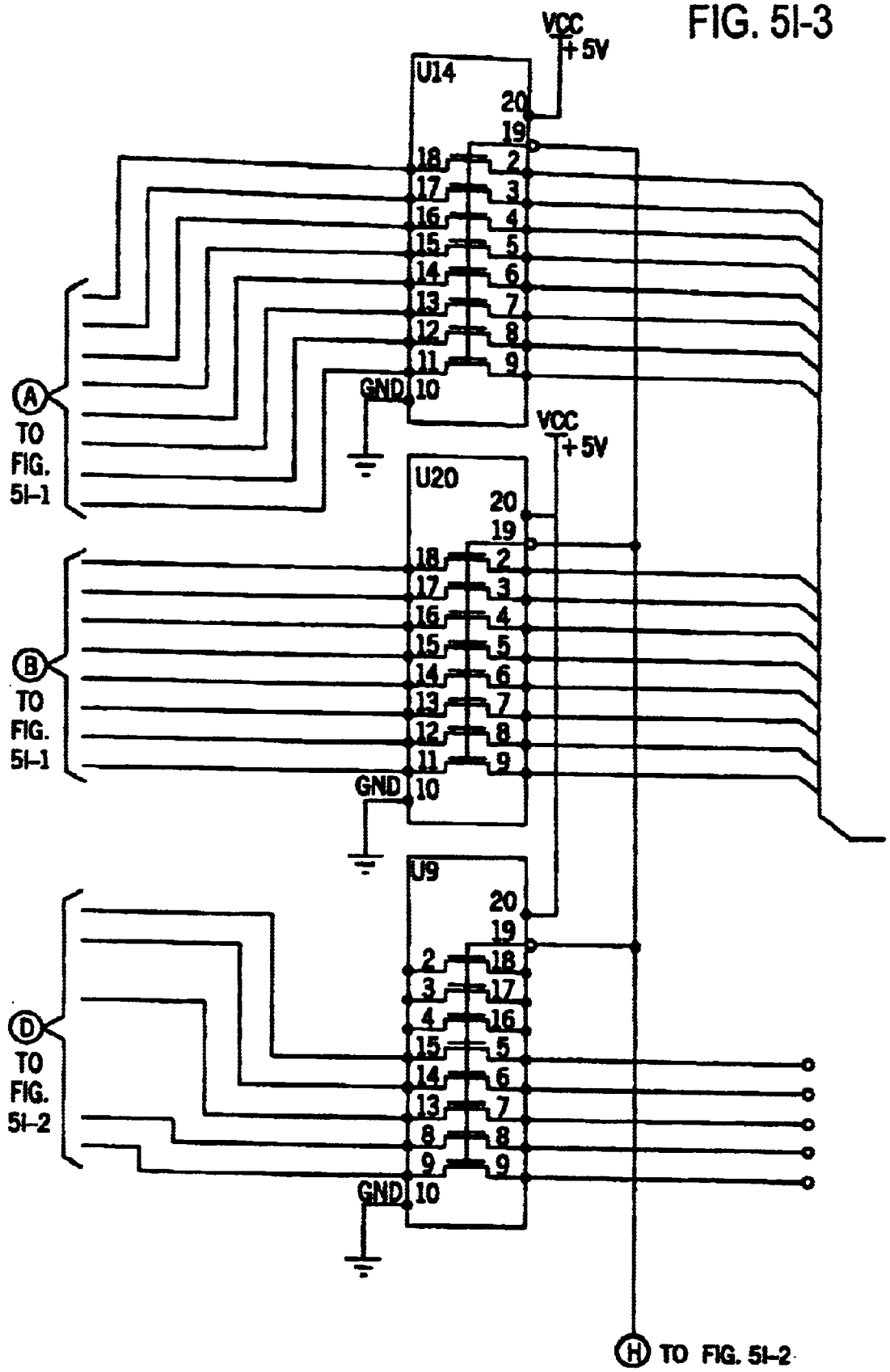
Figures 4, 51:
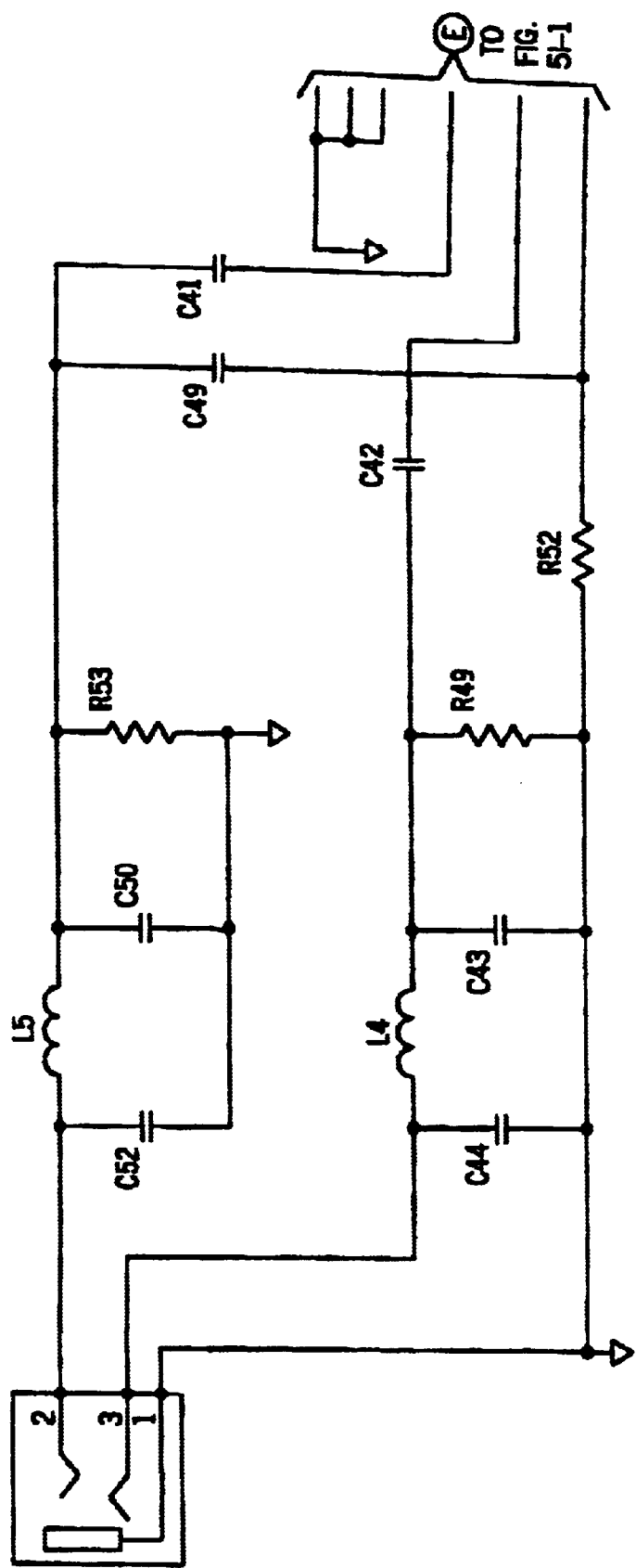
Figures 5, 51:
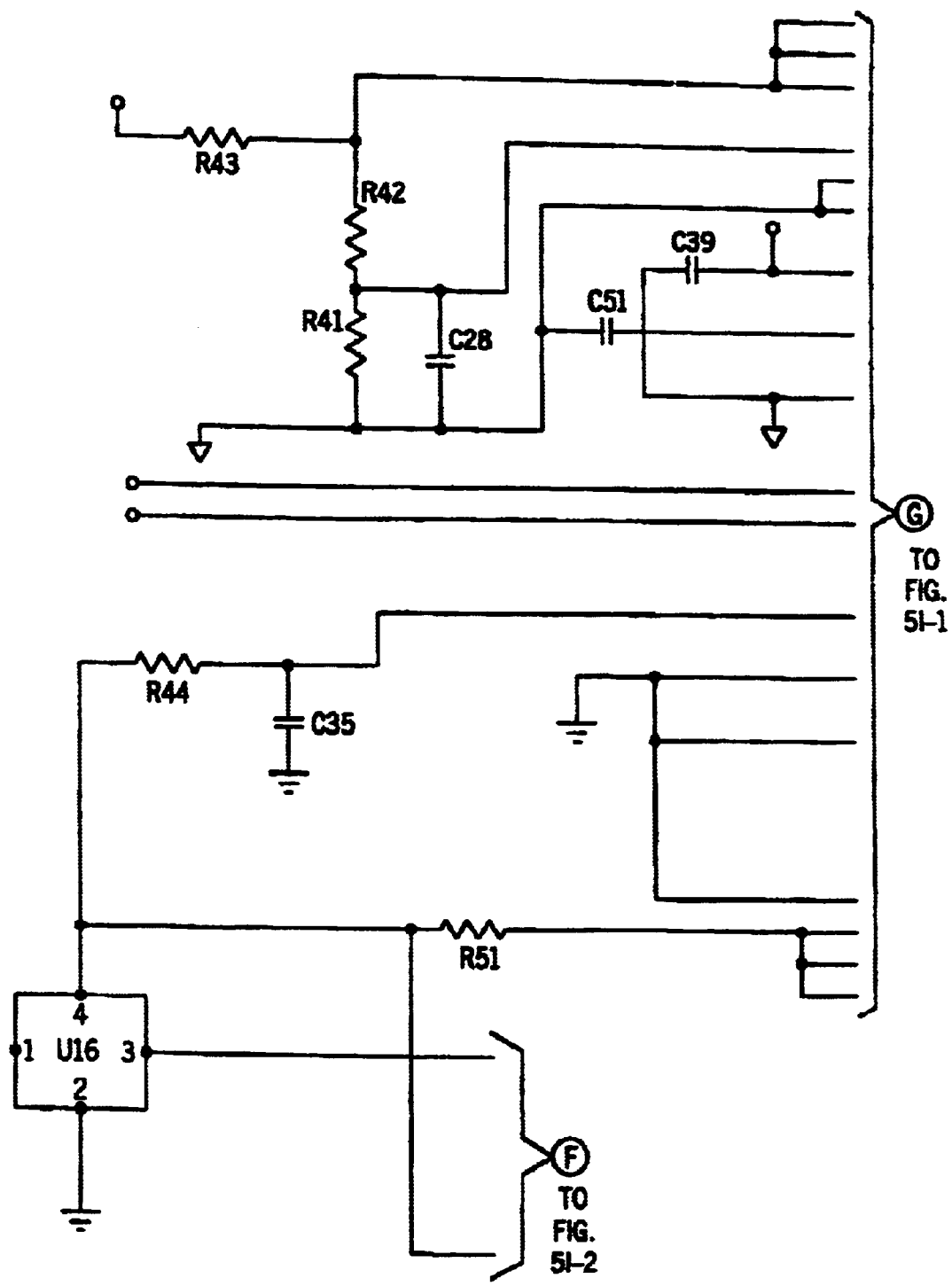
Figures 2, 5J:
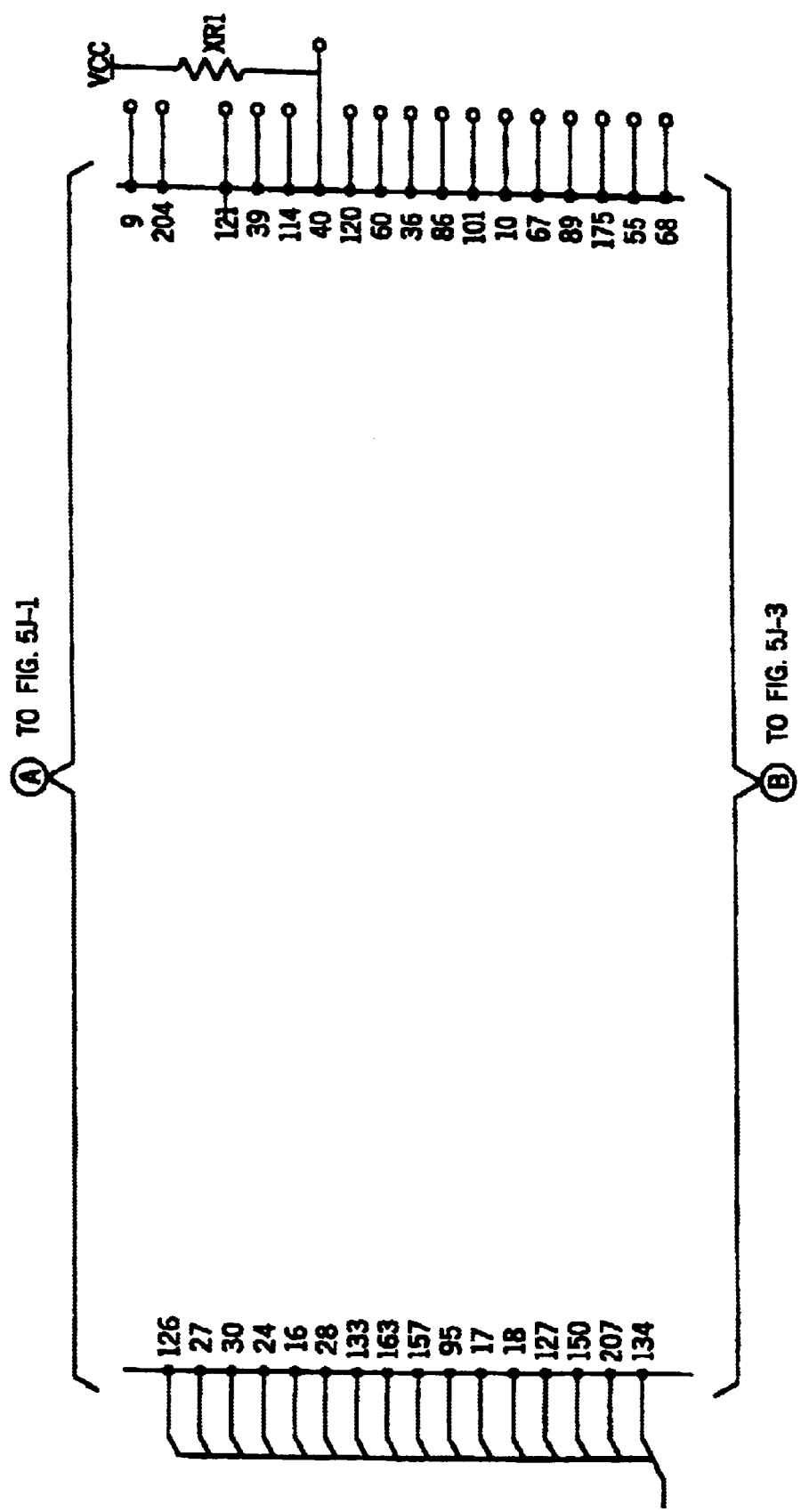
Figure 5J:
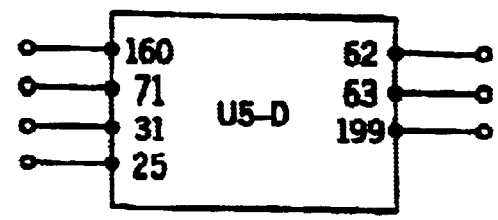
Figure 4:
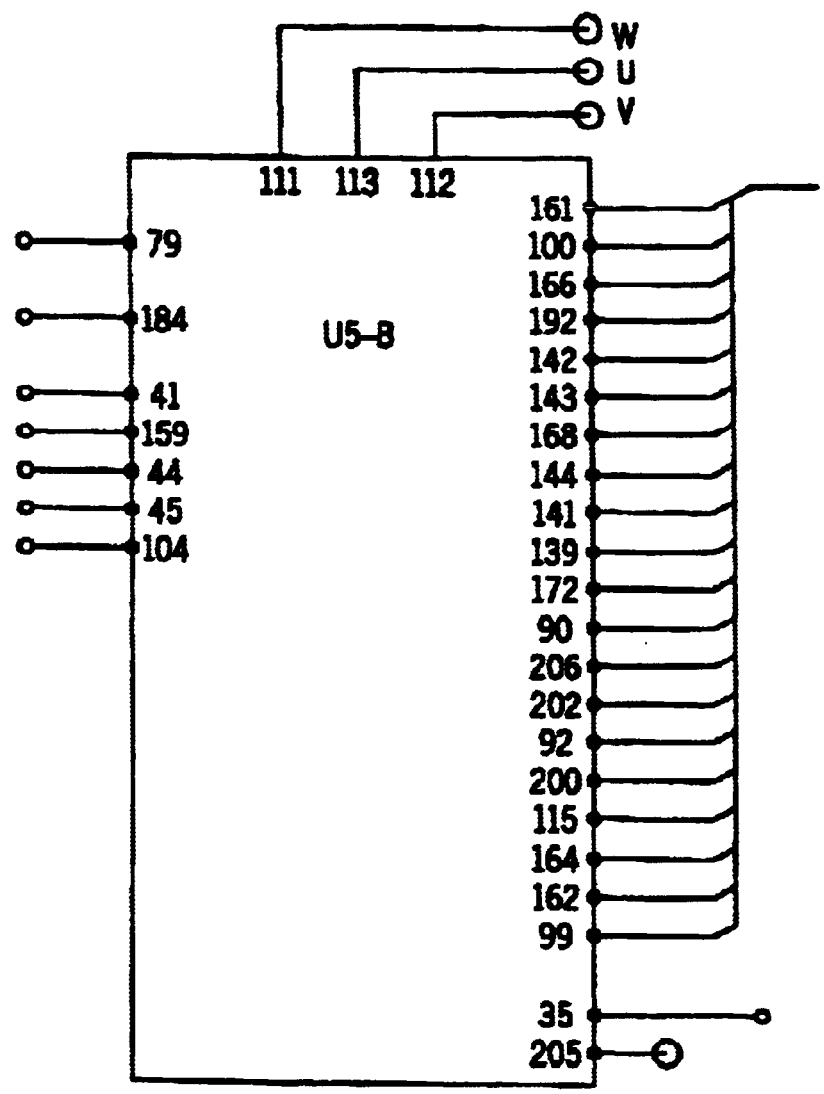
Figures 5, 5J:
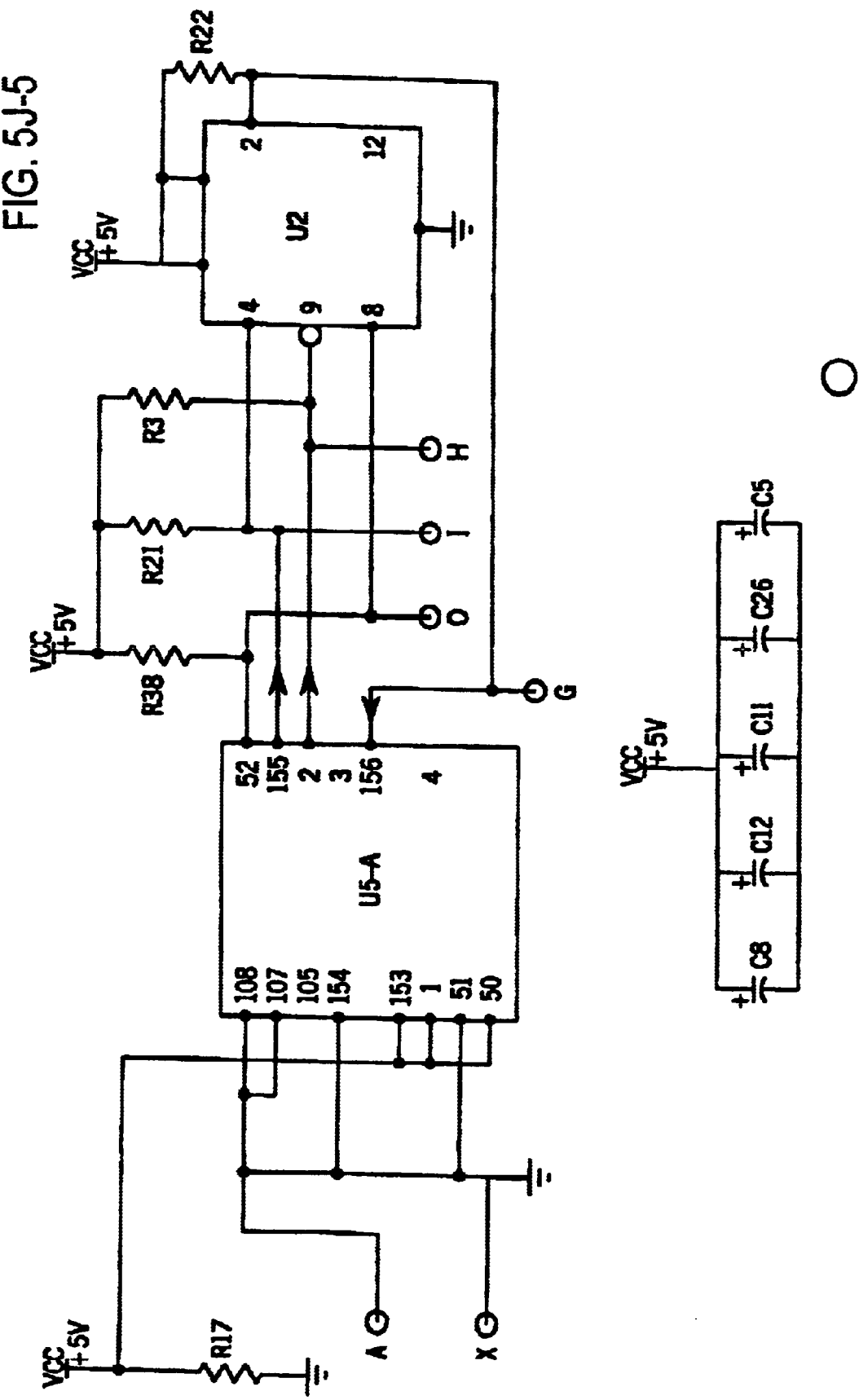
Figures 1, 5K:
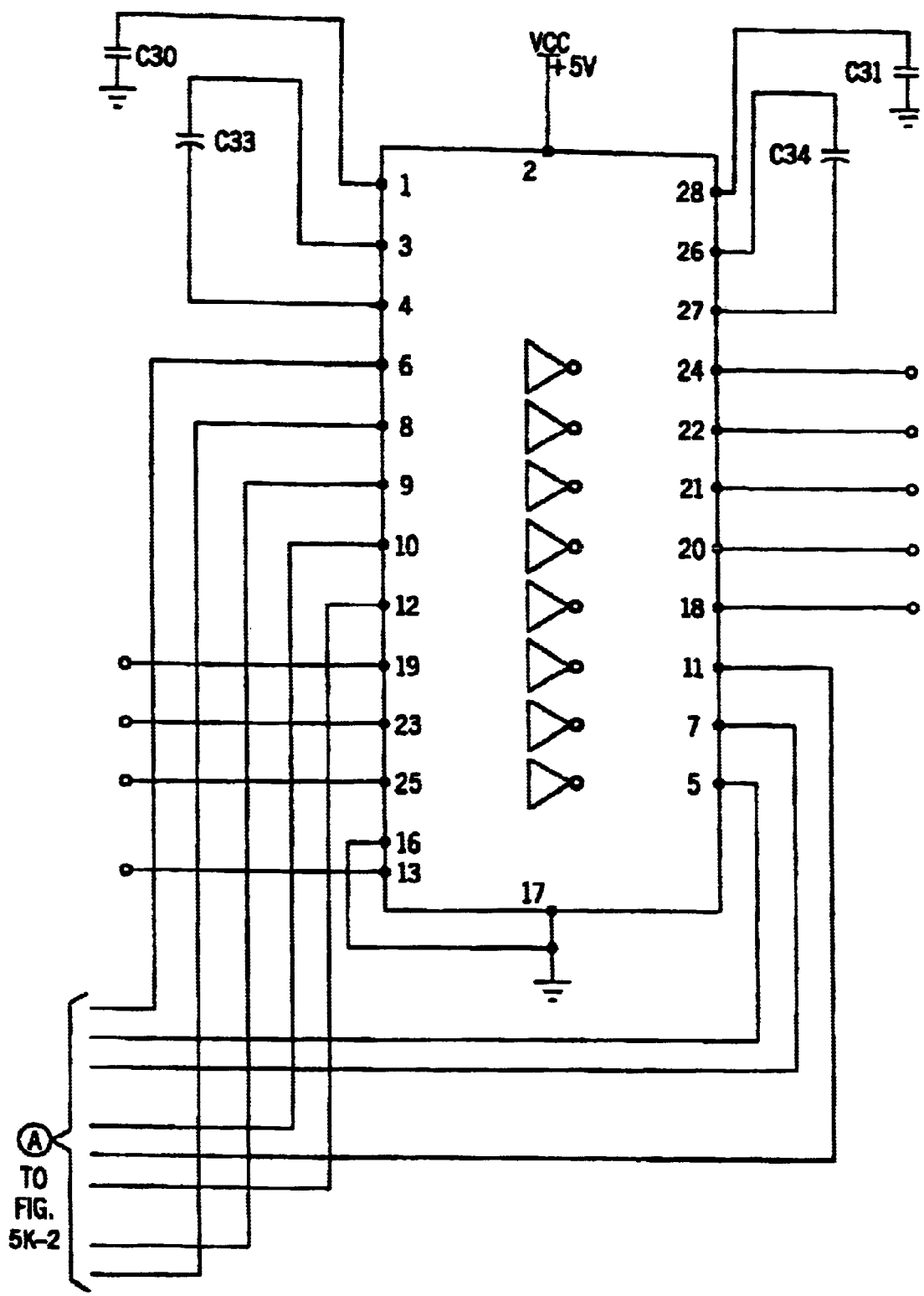
Figures 2, 5K:
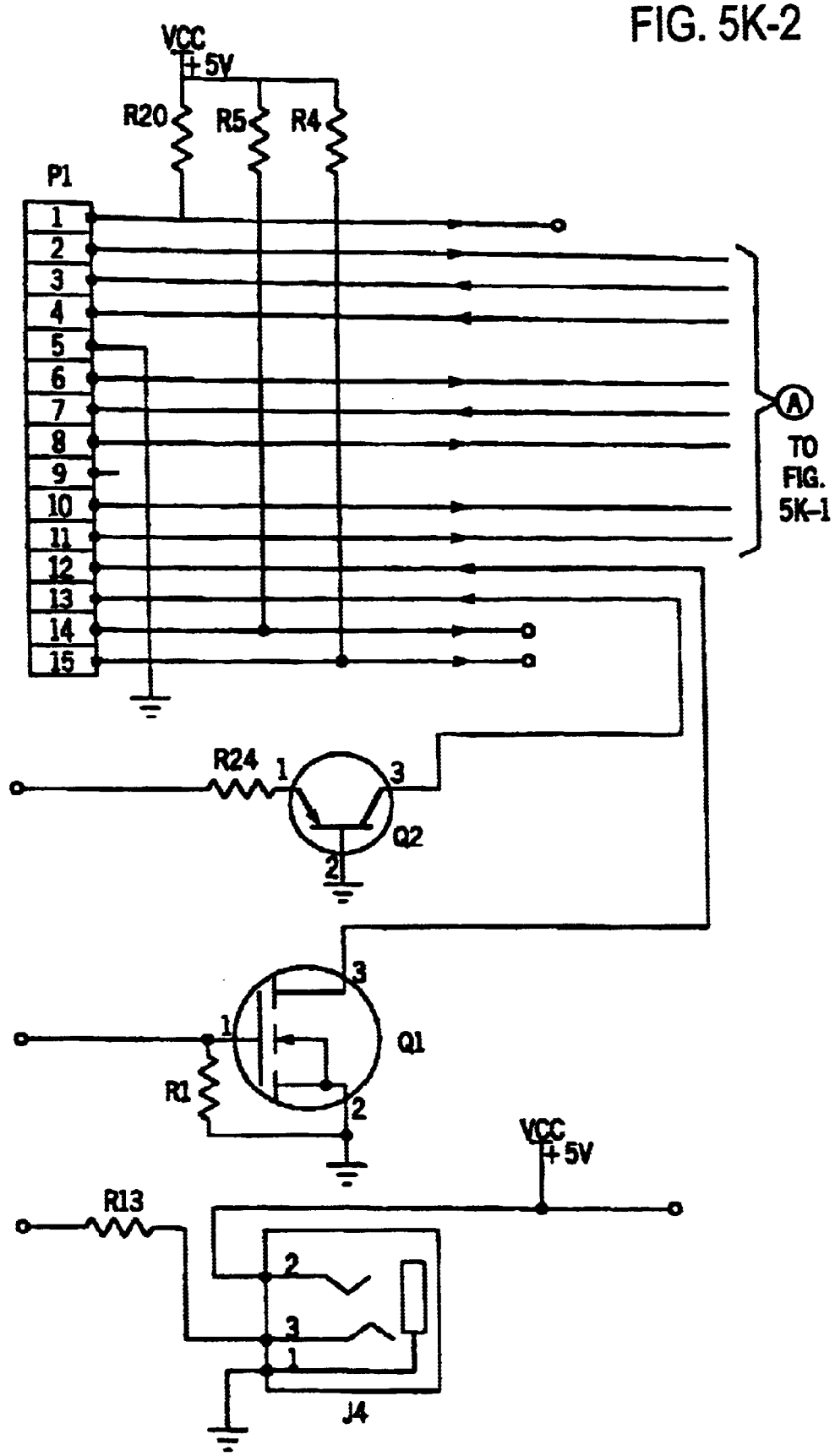
Figure 5L:
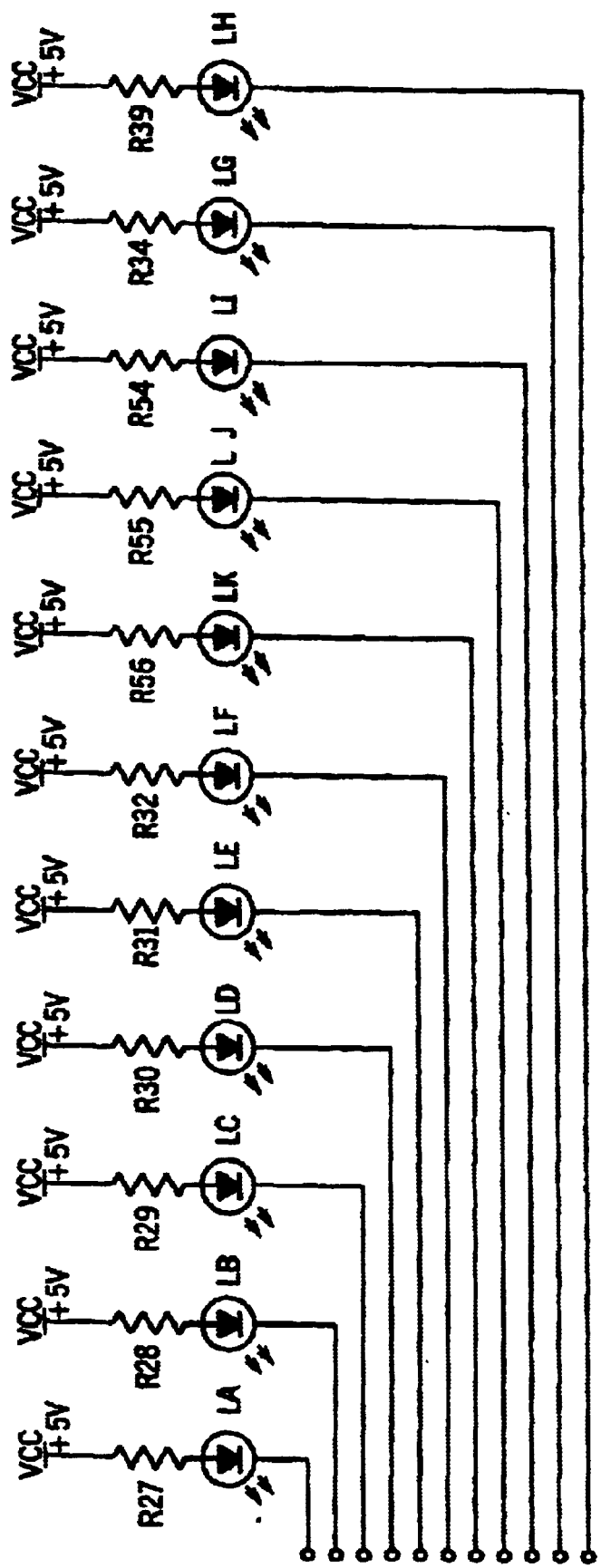
Figure 1:
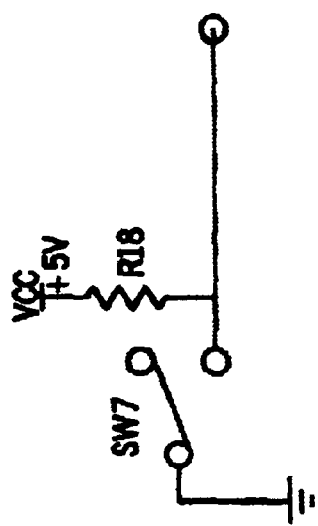
Figures 2, 5L:
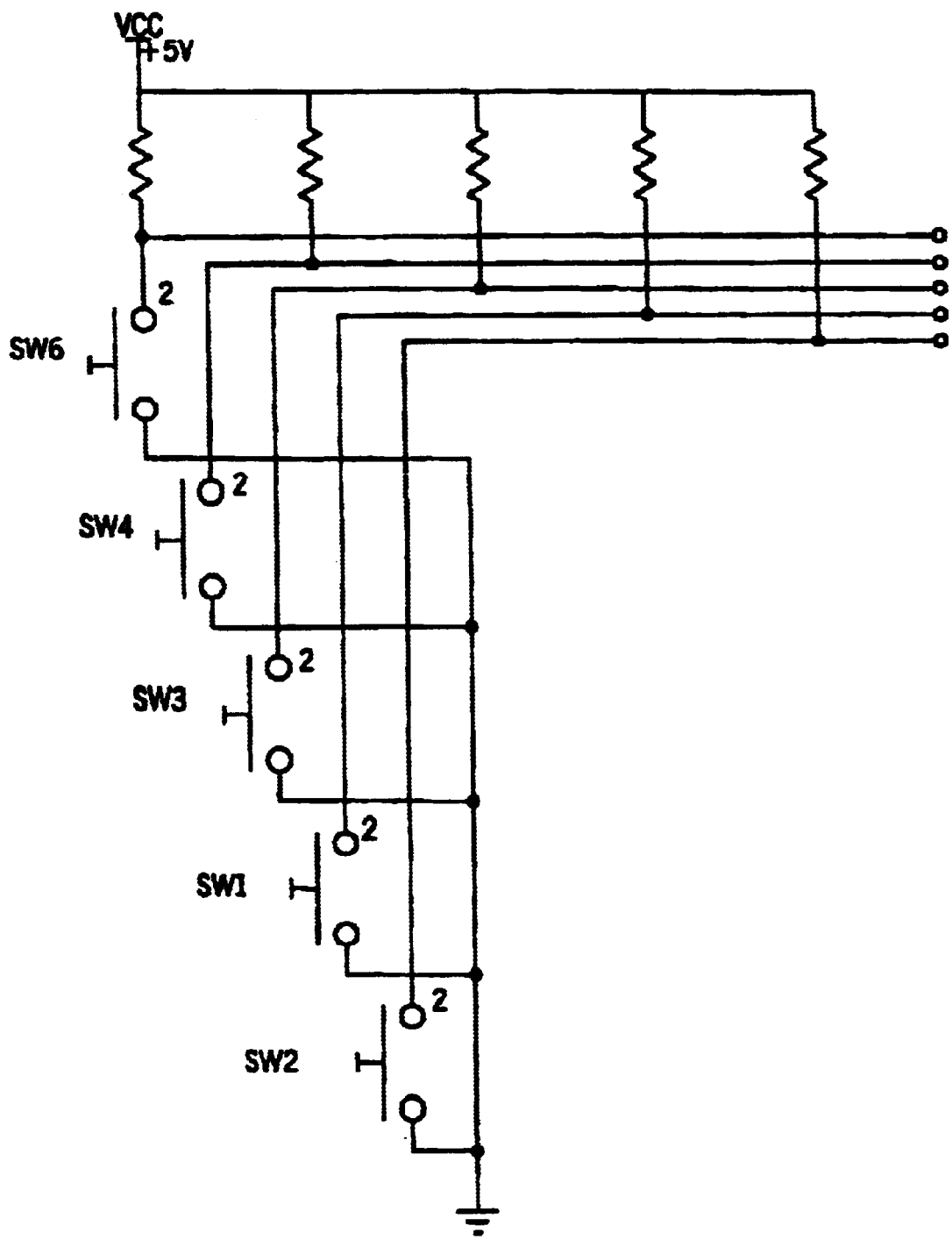

As shown in FIGS. 1 and 2, a series of LED readout lamps 64a–d are provided on side 26, 28 of the box 30. The control switches or buttons 66a–h are also located on the two sides of 26, 28 of the box 30. In the preferred embodiment, the lamp 64a indicates a busy processor signal, the lamp 64b indicates when the system is in a sending mode. Button 66d controls selection of the send mode. The lamps 64c indicate image storage capacity level. The button switches 66e and 66f controls the abort mode and erase mode, respectively. The control buttons 66a–c are on the opposite side panel 26 of the box 30 and include video input format switch 66a, resolution select button 66b an ON/OFF button switch 66c. High medium and low resolution indicator lamps 64e are also on this side panel. Switch 66h is the data capture switch.

Figure 4:
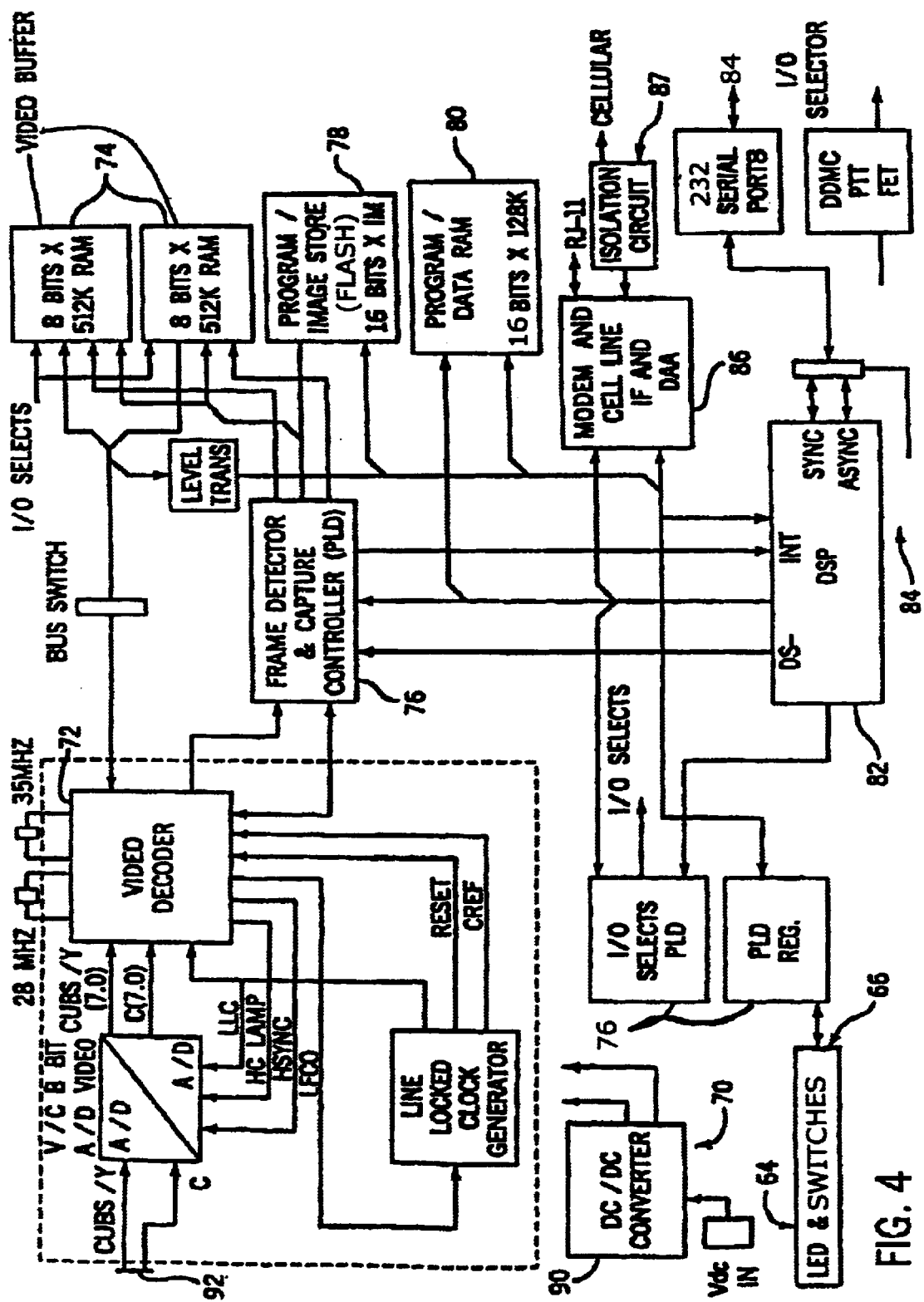
FIG. 4 is a block diagram of the circuitry of the preferred embodiment of the subject invention.

The circuitry housed on the processor board 32 and the modem board 36 is shown in FIG. 4. The circuitry is partitioned into distinct functional areas, as follows: DC/DC convertor power supply 70; push button control switches 66; lamps 64; the video decoder circuit 72; video buffer 74; frame and video buffer controller 76; image and program store 78; data Ram and program store 80; digital signal processor 82; RS-232 level synchronous and asynchronous ports 84; modem 86; RJ-11 presence switch 50 (see FIG. 3); and the I/O decoder 88.

The system is a battery operated frame grabber, video compressor, image transmission device adapted for accepting NTSC, composite or S-video as an input. In the preferred embodiment, it has a Harvard architecture DSP engine for compression and transmission. Transmission is accomplished via several methods, the asynchronous RS-232 port, the synchronous RS-232 port a cellular phone compatible modem or a land line modem interface. The modem 86 is implemented on the daughter board 36 (FIG. 3). The daughter board interface (not shown) allows other optional functions to be designed in place of the modem in the well-known manner.

The system memory is separated into two access areas: the program and data memory 80, each of which is 64K words; and the memory 78 accessed by a decode of the DSP address bus and the I/O instructions. A separate I/O address is implemented to allow contiguous memory blocks of greater than 64K words as is required for the large number of words in a frame of video. A programmable logic device (PLD) 76 provides the registers, extended I/O address and additional "glue logic" required.

The power supply 70 is adapted to receive between 5.5Vdc and 8.2Vdc which can be accepted as input to the DC/DC converter for providing output voltage of 5.0VDC. The video format selection is controlled by a combination of a single three conductor video input jack, and a slide switch 66a (FIG. 1) to indicate either S-video/monochrome or composite. The video input jack is a mini-phono jack 52, which will have the sleeve connected to ground. The tip contact is Y (luma) and the ring contact is C (chrominance) if the input is S-video. For composite or monochrome video inputs, the tip contact is the video. The Remote Capture Interface is a mini-phone jack 50, which provides both capture functions and busy LED feedback. The slide switch 66a provides a status bit to be read by the software. This bit is assigned to a bit position 10 in the general status register. For example, in the composite position the switch 66a is open and this is read as logic one in the register.

The video decoder 72 may be adapted to accept both S-video or composite PAL, NTSC OR SECAM signals. The video is input through the mini-phono jack 52 and is detected and available to the processor 82 via the video status bits in the system status register. In the preferred embodiment the decoder 72 is a Brooktree Bt829 which automatically detects PAL/SECAM and NTSC video standards. The format detected is available in the register set. The device features an extensive set of registers accessible via its I²C interface. These registers may be used to program the decoder to any of a variety of formats, as more fully described in the Bt829/Bt827 VideoStream II Decoders Manual, September, 1996, incorporated by reference herein. The decoder may be programmed to produce either 640×480 YcrCb images from an NTSC source or 768×576 YcrCb images from a PAL source. The decoder is powered on by a command from the processor 82 prior to capture of a frame and off by a command from the processor 82 upon completion of the capture of a frame. The decoder is isolated from the rest of the system by zero load buffers and isolation switches to allow power control. In the preferred embodiment, the decoder takes approximately 0.5 seconds to lock onto a valid video source. The decoder may be programmed 10 milliseconds after the decoder on command is initiated.

The video decoder 72 is controlled by an I²C Bus interface, which is implemented in the PLD 76 and accessed by software using bit positions 0 and 1, for SDA and SCL, respectively, in the I²C control register. A third bit, bit 2, is available for changing between master and slave mode. The default position is slave. This is further described in the Brooktree BT829/BT827 data sheet, incorporated by reference herein.

The video buffer 74 is a 16 bits wide by 512K deep buffer. The buffer holds one complete frame of NTSC square pixel imagery. The video buffer is written to by the video controller 76 which conditions the control signals provided by the video decoder 72. The buffer 74 is read by the processor 82 via the controller 76 which also conditions the control signals provided by the processor during an I/O operation. The video buffer is mapped into the processor I/O space. An extended I/O address is generated in a PLD. When the most significant bit extended i/o address 31 (MSB E1OAD31) of the I/O address bus is 0, the video buffer is selected.

The frame detector, extended address and video controller circuitry 76 identifies the start of a frame and initiates the capture of that frame. Image capture is initiated under software control by writing a logic 1 to bit position 6 (SNAP) of the power management and command register. The controller will issue a HOLD to the processor 82, and upon receipt of the acknowledge (HOLDA), takes control of the processor data bus. The controller waits for the odd field to start and then saves two consecutive fields in contiguous memory. As part of the capture sequence, this circuitry resets the extended address bus to all zeroes as the location of the first pixel data, auto increments the address and generates the write strobe for the video buffer 74 in response to the control inputs from the decoder 72. Upon completion of the frame, HOLD is released. The software is responsible for clearing the SNAP bit after released and before commanding another capture.

The controller 76 also provides the control signals and extended I/O address bus for reading the image in response to I/O operations by the processor 82. The extended I/O address bus operation is programmable by the processor. Three registers control operation of this bus. The first two set the base address used as the starting address. Since the address bus is 20 bits wide, two I/O locations are used to write the base address from the processor's 16 bit data bus. The third register is the offset register. The offset is added to the base address after each read or write to generate the next address to be accessed. This permits convenient traversing either across a line of pixels or down a column of pixels. During boot by the processor 82 the extended address bus will initialize to OOOOH and the increment by one after each read strobe of the processor. This requires that the module to be loaded be located at the bottom of the image/program store 78. Since the processor 82 uses only the least significant byte when booting, this section of code requires two memory locations for each word of executable code. Each word of the program must be divided into two bytes and loaded upper byte lower byte in that order into successive memory locations. Location 0000H must have the upper byte of the destination in program memory, and location 0001H must have the lower byte of the destination. The next two locations 0002H and 0003H must contain the upper byte and lower byte of the length in bytes to be loaded. This is more fully covered in the Boot Loader section of the TMS320C2xx User's Guide, incorporated by reference herein. Wait states for all memory accessed via the extended address bus will be controlled by the extended address bus controller.

The image and program storage 80 is a 16 bit×1 M flash file memory, providing lifetime up to 1 million erase cycles per block. Addresses are generated by the controller PLD 76 and the DSP 82. The image and program storage is mapped into I/O space except at processor boot. At power up, the designated boot block will be mapped into program space and the boot program loaded from the program storage FLASH RAM (78) into the program RAM 80. Upon completion of the boot operation, the program storage will revert to I/O space. The image and program store is selected in extended I/O memory space by setting the MSB EIOAD31, of the extended address to 1. Two wait states will be required for access to this memory. The number of wait states is controlled by the extended address bus controller. In the preferred embodiment, an Intel 28F016SV flash memory is used. Programming is controlled by the register set on the flash chip and the busy signal it provides. The busy signal RY/BY is inverted and connected to INT3 of the processor 82. This flash part features a 128 word buffer to allow writing of a page of data at a time. Complete details of this device are further described in the Intel data sheet, July, 1995 and the Specification Update, July, 1996, incorporated by reference herein.

The data and program run RAM 80 are each 64K words. The software will be responsible for controlling the software wait state register in the processor 82 for data and program ram access.

The data signal processor (DSP) 82 of the preferred embodiment is a Texas Instruments TMS320LC203 and has an advanced Harvard architecture, software programmable wait states, a synchronous serial port, and an asynchronous serial port. On board RAM, 544 words, is accessible as either data or program ram. A 20MHz oscillator will be used which results in single cycle instructions taking 50 ns. The processor monitors the control switches 66, interprets the commands and performs the tasks commanded, which include: (1) powering up and down; (2) loading the boot code; (3) initiating video capture; (4) video compression; (5) image transmission over the modem a) to wireless telephone; b) to landline; (6) image transmission over the RS-232 port; (7) reprogramming the flash memory; and (8) COMSEC interface over the RS-232 port. More complete details of the processor 82 are included in the Texas Instruments Data Sheet and Users Guide, incorporated by reference herein.

The on board cellular phone compatible modem 86 is set to interface to the cellular phone 10 through the cellular line interface drivers and receivers. The drivers and receivers provide any required level translation and connect to the cellular phone connector. An isolation circuit 87 is utilized before the cellular phone interface. This is accomplished by using an FET pack that is switched active and non-active by the RJ11 selection circuit: (1) Async with DTR data terminal ready; and or (2) Sync radio interface cable ID/DTR; or (3) Branch telephonic DAA, (a) RJ-11 switch or (b) cellular.

The modem provides a host interrupt to the processor 82, assigned to INT2 of the processor A. DAA (Direct Access Arrangement) circuit is provided for connection to the POTS telephone line. The isolation circuit is adapted to power down the entire data capture and transmission module whenever a data input signal is not present, preserving battery power. The system powers up only when the user engages the capture sequence by depressing the capture switch and begins transmission. In the preferred embodiment, the power up sequence takes 0.5 second.

FIG. 5 is an exemplary schematic of one embodiment of the invention, incorporating the features shown and described in FIG. 4. The pin and wire numbers are shown in the drawing. Viewing part A of the drawing from left to right, module 101 provides cellular phone power "on" "off". The microcontroller unit 103 is the modem controller. Module 104 is a crystal circuit for the modem 105. Amplifier 106 is a speaker amplifier. Part B shows the modem RAM 107 and the modem program storage memory 108. Part C is the cell phone interface section of the circuit. The amplifier 109 is the D.C. reference buffer. Amplifier 110 is the modem RX signal amplifier and signal conditioner. Amplifier 111 is the POTS landline RX amplifier and signal conditioner. Switches 112 are the cell phone isolation switches. The blocked area 113 provide cell phone EMI filters. Part D is the POTS direct access arrangement, with signal level clamping circuitry 114, with an isolation transformer at 115. AC isolation is provided by the capacitor network 116 comprising capacitors C26 and C27. The blocked area 117 is the POTS line loading current control. The diode bridge 118 provides a polarity bridge. Switch 48 at 119 provides "off hook" or open line switch and a ring detection circuit. A surge protector is provided at 121, and an EMI filter networks provided at 122. Part E is the power management circuitry. Circuit 123 is the battery voltage sensor. The power switch is provided at 125, with the power-up process status driver at 125, the processor power on switch at 126 and the main power switching circuit at controller 129. Switch 130 is the video decoder power.

Part F is the Processor 131, with the oscillator at 132. Part G shows the program and data RAM 133 and connectors 134. Part H shows the video buffer RAM 135 and 136. The program and image storage flash RAM is shown at 137. Part I includes the video oscillator 138 and video input and conditioning circuitry 139 for managing input into the video decoder 140. The video decoder isolation switches are shown at 141; the video address generator PLP 1142; the videotiming and glue logic PLP 143; the PLD bootstrap logic 144 and the serial PROM (1X256K) boot program module 145 for PLD 144.

Part K includes the remote trigger jack 146, the radio keying FET (PTT) 147; the radio digital mode keying transistor or digital data mode control (DDMC) 148 and the serial I/O drivers and receivers 149. The data port is designated as 150. Part L is the LED array 151; the composite/s-video switch 1152 and the push button array 153.

The preferred embodiment captures the high-resolution (640×480) full color images from any NTSC source like video cameras, monochrome image intensifiers, monochrome night visions devices (such as FLIRs) and the like. Depending on application, medium and low resolution may also be selected based on user selection. The system can be operated locally or remotely through the host interface software. In the remote mode, the image can be captured, stored and/or transmitted by remote "dial up" using land line telephone or cellular systems, or other communications systsems such as radio or the like. In the preferred embodiment, the system firmware may be loaded and accessed for troubleshooting via remote access as well.

The system of the present invention is specifically designed to operate over the public switched land line telephonic systems (POTS) and cellular services. The invention is designed with a hardware port for digital radio operation, as well.

The preferred embodiment of the invention is fully compatible with and integrates with a standard AMP cellular phone such as by way of example, a Motorola flip phone, and supports NTSC monochrome composite and S-video sources including video cameras, camcorders, VCRs, still image cameras, image intensifiers and FLIR-night vision devices. In the preferred embodiment, all of the circuitry for the system is on a card or slice which is inserted between the battery pack and the body of a standard Motorola cellular phone. Full isolation of the system circuitry is provided, permitting power preservation for cellular telephone use when data transmission is not activated.

The present invention, permits a still frame visual image to be captured at a remote location and either stored locally or sent immediately, over land line or wireless communication systems, to a remote location such as, by way of example, a computer system wherein the image could be merged directly into newsprint. The image may also be printed as a hard copy using any Windows based printer or Group-III facsimile machine, anywhere in the world. Where desired, the images may be stored in memory for later recall, and may be archived on a portable medium such as a memory card or the like. In addition to multiple resolution capability, the system may be used with multiple compression algorithms such as JPEG, wavelet and other compression schemes.

In the preferred embodiment of the invention, the controller is programmed to permit smart addressing of the video RAM, allowing for row or column access to the image data, decimation and non-linear, sequential pixel access.

Other configurations are contemplated and are within the teachings of the invention. While specific embodiments have been shown and described herein, it will be understood that the invention includes all modifications and enhancements within the scope and spirit of the claims.

What is claimed is:

1. A modular image processing device for receiving and capturing a visual image from an external source and transmitting said image to a remote receiving station, the image processing device comprising:
    a housing shaped and sized to be removably affixed to the battery compartment within the body of a cellular telephone;
    an image data receiving and processing system within the housing to receive a video signal from an external video source and to produce an output signal in a format transmittable over a telephone system; and
    an interface means operably associated with the data and receiving processing system for interface with an external video source.

2. The processing device of claim 1 wherein interface means comprises a data port cable having an external connector plug for reversable connection to an external video source.

3. The processing device of claim 1 further comprising a battery compartment for selectively receiving a cellular telephone battery.

4. The processing device of claim 1 wherein the housing further comprises a side panel having an LED display light thereon to display a visual indicia of at least one operational state for the processing device.

5. The processing device of claim 1 further comprising a remote triggering device for capturing a video image data signal upon remote initiation.

6. The processing device of claim 1 further comprising means for selectively and alternatively connecting the device to a land line telephone system whereby the output data signal may be transmitted over the land line telephone.

7. A modular image processing device for receiving and capturing a visual image from an external source and transmitting said image to a remote receiving station, the image processing device comprising:
    a housing shaped and sized to be removably affixed to a battery compartment within the body of a cellular telephone;
    an image data receiving and processing system within the housing to receive a video signal from an external video source and to produce an output signal in a format transmittable over a telephone system;
    an interface means operably associated with the data and receiving processing system for interface with an external video source; and
    said housing having a power transfer circuit for channeling electrical power from a cellular telephone battery retained within said battery compartment to said data receiving and processing system.

8. The processing device of claim 7 further comprising a remote triggering device for capturing a video image data signal upon remote initiation.

9. The processing device of claim 7 wherein the housing further comprises a side panel having an LED display light thereon to display a visual indicia of at least one operational state for the processing device.

10. The processing device of claim 9 wherein the side panel retains an on/off switch for the processing device.

11. The processing device of claim 7 wherein the means for selectively and alternatively connecting the device to a land line telephone system comprises a detection circuit for detecting the presence of a land line telephone hookup.

12. The processing device of claim 7 further comprising a compression device within the housing for compressing data representing a captured image.

13. The processing device of claim 7 further comprising a video image storage memory within the housing for storing an image after capture.

14. The processing device of claim 13 further comprising an addressing device for addressing a video image on a selected pixel-by-pixel basis in the storage memory.

15. A modular image processing device for receiving and capturing a visual image from an external source and transmitting said image to a remote receiving station, the image processing device comprising:
    a housing shaped and sized to be removably affixed to a battery compartment within the body of a cellular telephone;
    an image data receiving and processing system within the housing to receive a video signal from an external video source and to produce an output signal in a format transmittable over a telephone system;

an interface means operably associated with the data and receiving processing system for interface with an external video source; and a means for selectively and alternatively connecting the device to a land line telephone system whereby the output data signal may be transmitted over the land line telephone.

16. The processing device of claim 15 further comprising a video image storage memory within the housing for storing an image after capture.

17. The processing device of claim 10 further comprising an addressing device for addressing a video image on a selected pixel-by-pixel basis in the storage memory.

18. The processing device of claim 15 wherein the housing further comprises a side panel having an LED display light thereon to display a visual indicia of at least one operational state for the processing device.

19. The processing device of claim 15 wherein the side panel retains an on/off switch for the processing device.

* * * * *